US011832158B2

(12) United States Patent
Bergström et al.

(10) Patent No.: US 11,832,158 B2
(45) Date of Patent: *Nov. 28, 2023

(54) SEGMENTATION OF PWS-MESSAGE AND ASSOCIATED AREA-INFORMATION

(71) Applicant: Telefonaktiebolaget LM Ericsson (publ), Stockholm (SE)

(72) Inventors: Mattias Bergström, Sollentuna (SE); Stephen R. Hayes, Flower Mound, TX (US); Jens Bergqvist, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/985,222

(22) Filed: Nov. 11, 2022

(65) Prior Publication Data
US 2023/0077415 A1      Mar. 16, 2023

Related U.S. Application Data

(63) Continuation of application No. 17/258,779, filed as application No. PCT/SE2019/050647 on Jul. 1, 2019, now Pat. No. 11,533,601.
(Continued)

(51) Int. Cl.
*H04W 4/90*     (2018.01)
*G08B 27/00*   (2006.01)
(Continued)

(52) U.S. Cl.
CPC ............ *H04W 4/90* (2018.02); *G08B 27/006* (2013.01); *H04W 4/021* (2013.01); *H04W 4/12* (2013.01)

(58) Field of Classification Search
CPC ....... H04W 4/021; H04W 4/90; H04W 48/12; H04W 76/50; H04W 72/005;
(Continued)

(56) References Cited

U.S. PATENT DOCUMENTS

| 6,090,056 A * | 7/2000 | Bystrom ............. A61H 31/004 379/38 |
| 2004/0172510 A1 | 9/2004 | Nagashima et al. |

(Continued)

FOREIGN PATENT DOCUMENTS

| CN | 103024697 A | 4/2013 |
| CN | 104618880 A | 5/2015 |

(Continued)

OTHER PUBLICATIONS

3GPP, "3rd Generation Partnership Project; Technical Specification Group Core Network and Terminals; Technical realization of Cell Broadcast Service (CBS) (Release 11)", 3GPP TS 23.041 V11.2.0, Mar. 2012, 1-57.

(Continued)

*Primary Examiner* — Jean A Gelin
(74) *Attorney, Agent, or Firm* — Murphy, Bilak & Homiller, PLLC

(57) ABSTRACT

A network node obtains a message to be transmitted as a public warning system notification to multiple UEs, via one or more SIBs, and obtains area information corresponding to the message. The area information indicates an area for which the message is relevant. The network node determines how many SIBs are needed for transmitting the area information and segments the message into a plurality of segments, based on how many SIBs are needed for transmitting the area information. The network node transmits the message and the area information via SIBs, such that a segment of the message is included in each SIB and such that each portion of the area information included in a SIB is accompanied by a segment of the message. A UE receives the SIBs and assembles the message and area information, displaying the message if it is relevant.

19 Claims, 16 Drawing Sheets

Related U.S. Application Data

(60) Provisional application No. 62/696,170, filed on Jul. 10, 2018.

(51) Int. Cl.
*H04W 4/021* (2018.01)
*H04W 4/12* (2009.01)

(58) Field of Classification Search
CPC . H04W 84/042; H04H 20/59; H04L 12/1895; H04L 69/30
See application file for complete search history.

(56) References Cited

U.S. PATENT DOCUMENTS

| | | | |
|---|---|---|---|
| 2011/0090828 A1* | 4/2011 | Zhu ................. | H04W 76/40 370/310 |
| 2011/0171929 A1* | 7/2011 | Tamura ............. | H04W 48/12 455/404.1 |
| 2014/0086145 A1* | 3/2014 | Ramkumar ........ | H04L 1/1864 370/328 |
| 2015/0147958 A1 | 5/2015 | Wang et al. | |
| 2015/0147995 A1 | 5/2015 | Bontu et al. | |
| 2015/0201316 A1* | 7/2015 | Khatibi ............. | H04W 4/90 455/404.2 |
| 2015/0304830 A1* | 10/2015 | Ni .................... | H04W 4/029 455/404.2 |
| 2015/0350863 A1 | 12/2015 | Tsutsui | |
| 2017/0163309 A1* | 6/2017 | Ohta ................. | H04W 76/18 |
| 2017/0208543 A1* | 7/2017 | Zhang .............. | H04W 36/0072 |
| 2017/0215047 A1 | 7/2017 | Lee et al. | |
| 2017/0311278 A1 | 10/2017 | Adjakple et al. | |
| 2018/0124574 A1* | 5/2018 | Byun ................ | H04W 88/08 |
| 2018/0352416 A1* | 12/2018 | Ryu ................... | H04W 4/08 |
| 2019/0246260 A1* | 8/2019 | Edge ................ | G08B 27/006 |
| 2019/0320443 A1* | 10/2019 | Wang ............... | H04W 72/0493 |

FOREIGN PATENT DOCUMENTS

| | | |
|---|---|---|
| CN | 107223352 A | 9/2017 |
| EP | 2699972 A1 | 2/2014 |
| JP | 2011525095 A | 9/2011 |
| JP | 2017508353 A | 3/2017 |
| JP | 2018524752 A | 8/2018 |
| WO | 2012143043 A1 | 10/2012 |
| WO | 2014103681 A1 | 7/2014 |
| WO | 2015105793 A1 | 7/2015 |
| WO | 2015118648 A1 | 8/2015 |
| WO | 2016210110 A1 | 12/2016 |
| WO | 2017197063 A1 | 11/2017 |
| WO | 2018093208 A1 | 5/2018 |

OTHER PUBLICATIONS

3GPP, "3rd Generation Partnership Project; Technical Specification Group Radio Access Network; Evolved Universal Terrestrial Radio Access (E-UTRA); Multiplexing and channel coding (Release 15)", 3GPP TS 36.212 V15.2.1, Jul. 2018, 1-245.

3GPP, "3rd Generation Partnership Project; Technical Specification Group Radio Access Network; Evolved Universal Terrestrial Radio Access (E-UTRA); Physical layer procedures (Release 14)", 3GPP TS 36.213 V14.7.0, Jun. 2018, 1-468.

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.1.0, rDraft 36331-fx0 P7 (7-end)_v01, Mar. 2018, 1-895.

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.2.2, Jun. 2018, 1-791.

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.3.0, Sep. 2018, 1-770.

Unknown, Author, "Public Warning System (PWS)", 3GPP TSG-RAN WG2 Meeting #66bis, Los Angeles, USA, R2-093943, Jun. 29-Jul. 3, 1-6.

Zhang, Yue, "Several Problems of Urban Rail Transit Hub Emergency Evacuation based on ACP Approach", Engineering Science and Technology, Edition II, Feb. 28, 2014, 1-80.

Unknown, Author, "Corrections on Value Tags for PWS (RIL: v005)", 3GPP TSG-RAN WG2 NR AH1807 Meeting R2-1810623, Montreal, Canada, Jul. 2-6, 2018, 1-3.

Unknown, Author, "PWS support in RRC", 3GPP TSG-RAN WG2 meeting #67 R2-094296, Shenzhen, China, Qualcomm Europe, at&t, T-Mobile US, Nokia Siemens Networks, Aug. 24-28, 2009, 1-16.

* cited by examiner

SEGMENTATION OF PWS-MESSAGE AND ASSOCIATED AREA-INFORMATION

TECHNICAL FIELD

The present disclosure generally relates to the field of wireless network communications, and, more particularly, to mobile alert systems.

BACKGROUND

In Long Term Evolution (LTE), there is a feature for providing Public Warning System (PWS) notifications to user equipments (UEs) that can be used to provide warning messages to users. For example, if there is an earthquake, the network can indicate this to the UEs by broadcasting PWS messages. This is expected to be introduced for New Radio (NR) as well.

The PWS messages for the Earthquake and Tsunami Warning System (ETWS) are broadcast in SystemInformationBlockType10 (ETWS primary notification) or SystemInformationBlockType11 (ETWS secondary notification), and PWS-messages for the Commercial Mobile Alert System (CMAS) are broadcast in SystemInformationBlockType12. These system information block types are defined in the LTE Radio Resource Control (RRC) specification 3GPP TS 36.331. It should be noted that other types of Public Warning Systems include European Union (EU) Alert and Korean Public Alert System (KPAS).

If an ETWS secondary notification message or a CMAS notification message is large, the message can be divided into several segments and the segments are sent sequentially to the UE. There can be at most 64 segments, per the specifications for LTE, and the base station (e.g., eNB) indicates the number of each segment. Further, the eNB can indicate whether a certain segment is the last segment or not. When the UE has acquired all segments of a message, the RRC-layer in the UE reassembles all segments and forwards them to upper layers, to be presented to the user. Segmentation is not supported for the ETWS primary notification message, because it is a small message that is intended to be received by the UEs within a very limited time frame.

It is possible to send multiple PWS messages by sending them sequentially. So, if a first and a second message is to be sent to the UE, the eNB would first send all segments of the first message and then send all the segments of the second message. Each message can be sent periodically. Each message is further associated with a message identifier and a serial number.

Some PWS notifications may only be applicable for certain areas, such as an area close to a mall. To ensure that only users that are within the area are getting these notifications, the PWS notifications may have an associated area indication. This may, for example, be implemented by only providing the PWS notification in only one, or some, cells. As an alternative, the PWS notification can be included in an RRC message with an indication of the applicable area. The UE, upon receiving the PWS notification, determines whether it is inside or outside the area. If the UE is inside the area, the UE would then display the indication to the user. Otherwise, the UE will not display the indication.

In LTE and NR, system information is sent in so-called System Information Blocks (SIBs). In LTE, the physical layer imposes a limit to the maximum size of an SIB. When downlink control information (DCI) format 1C is used, the maximum allowed by the physical layer is 1736 bits (217 bytes) while for format 1A the limit is 2216 bits (277 bytes) (TS 36.212 and TS 36.213). For bandwidth-reduced low-complexity (BL) UEs and UEs in enhanced coverage (CE), the maximum SIB and system information message size is 936 bits (TS 36.213). For narrowband Internet-of-Things (NB-IoT), the maximum SIB and system information size is 680 bits (TS 36.213).

In LTE systems, CMAS PWS messages are sent in SystemInformationBlockType12. SystemInformationBlockType12 has a mandatory present field carrying a segment of, or the complete, PWS message. This means that the network must send at least a segment of a PWS message each time it sends SystemInformationBlockType12.

A legacy UE that receives, for example, a SystemInformationBlockType12 must be able to successfully decode the message. The corresponding requirement applies for SystemInformationBlockType11 (for ETWS secondary notification) and for SystemInformationBlockType10 (for ETWS primary notification). The latter however always includes the full message (ETWS primary notification) in a single SystemInformationBlockType10.

SUMMARY

Area information for public warning system (PWS) messages may be large when providing information for complex area structures. To be able to send this information for complex area structures, the PWS messages may need to be segmented into smaller parts, in order to fit in a transmission of a SIB. In some cases, the PWS message may be small and thus can be sent in a small number of segments, while the associated area information is large and thus requires a larger number of segments in order to transmit them. The embodiments described herein enable a network node to account for the sizes of both the PWS message and area information when transmitting the PWS message and area information via system information. The PWS messages and their associated area information can be segmented such that they can be sent to UEs via the system information.

In a first example, the network may segment area information for a PWS message such that the number of segments for the PWS message is at least as large as the number of segments of the area information. In another example, the network may extend the PWS message such that it can be segmented into at least as many segments as needed for the area information. In a third example, the network may send the PWS message in a first SIB and send the associated area information in a second SIB. The UE receiving the PWS message can receive and assemble the segments for the PWS message in the SIBs and then display the PWS message to the user if the UE determines from the area information that the PWS message is relevant to the user.

According to some embodiments, method, in at least one network node of a wireless communication system serving a plurality of UEs, includes obtaining a message to be transmitted as a public warning system notification to multiple UEs, via one or more SIBs. The method also includes obtaining area information corresponding to the message, the area information indicating an area for which the message is relevant and determining how many SIBs are needed for transmitting the area information. The method further includes segmenting the message into a plurality of segments, based on how many SIBs are needed for transmitting the area information and transmitting the message and the area information via SIBs, such that no more than one segment of the message is included in any of the transmitted SIBs and such that each portion of the area information included in a transmitted SIB is accompanied by a segment of the message.

According to some embodiments, a method, in at least one network node of a wireless communication system serving a plurality of UEs, includes obtaining a message to be transmitted as a public warning system notification to multiple UEs, via one or more SIBs, and obtaining area information corresponding to the message, where the area information indicates an area for which the message is relevant. The method further includes transmitting at least some of the message via a first SIB and transmitting at least some of the area information via a second SIB, such that the second SIB contains linking information indicating that the included area information corresponds to the message sent via the first SIB.

According to some embodiments, a method, in a UE served by a wireless communication network, includes receiving a plurality of SIBs. The method includes obtaining, from each of the SIBs, a portion of area information indicating an area for which a public warning system notification is relevant, and obtaining, from each of these same SIBs, a segment of a message. The method also includes assembling area information from the portions of area information and assembling the message from at least the corresponding segments of the message. The method further includes determining, based on the area information, that the message is relevant to the UE and displaying the message, in response to the determining.

According to some embodiments, a method, in a UE served by a wireless communication network, includes receiving at least a portion of a public warning system notification message via a first SIB and receiving at least a portion of area information via a second SIB. The method further includes determining, based on linking information included in the second SIB, that the area information included in the second SIB corresponds to the message received via the first SIB and determining, based on the area information, that the message is relevant to the UE. The method further includes displaying the message, in response to the determining.

Further aspects of the present invention are directed to an apparatus, network node, base station, wireless device, UE, computer program products or computer readable storage medium corresponding to the methods summarized above and functional implementations of the above-summarized apparatus and UE.

Of course, the present invention is not limited to the above features and advantages. Those of ordinary skill in the art will recognize additional features and advantages upon reading the following detailed description, and upon viewing the accompanying drawings.

DETAILED DESCRIPTION

Exemplary embodiments of the present disclosure will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment can be tacitly assumed to be present/used in another embodiment. Any two or more embodiments described in this document may be combined with each other. The described embodiments are not limited to LTE or NR and can be adapted in other radio access technologies (RATs), such as in UTRA, LTE-Advanced, 5G, NX, NB-IoT, Wi-Fi, BLUETOOTH technologies, or in any subsequent systems by which PWS messages are provided.

With regards to the terms "system information block" and "SIB" as used herein, it should be understood that "a system information block" or "a SIB" refers to a single structured transmission of system information, labeled as "system information block" or "SIB," or the like. According to the techniques described herein, information from multiple ones of these transmissions may be combined to form a complete message, such as a PWS message. These multiple transmissions are referred to herein a SIBs or system information blocks (i.e., in the plural form). Thus, as used herein, "a system information block" and "a SIB" should not be understood to refer to the aggregation of information from multiple SIB transmissions.

Figure 1:
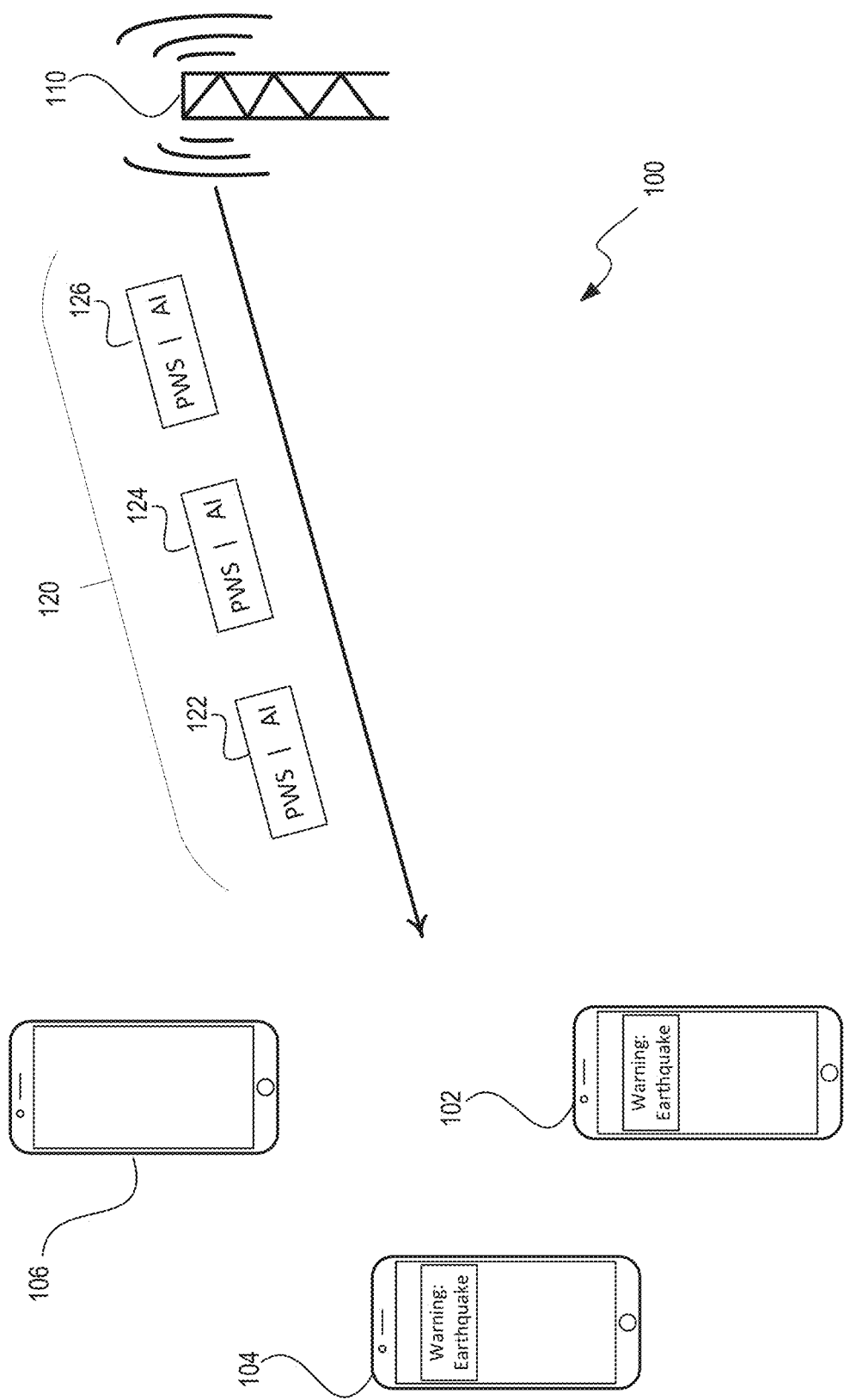
FIG. 1 illustrates an example of a network node that sends a PWS message and area information to UEs in multiple segments, according to some embodiments.

FIG. 1 illustrates, according to some embodiments, a network node (e.g., eNB, gNB) 110 in a wireless communication network 100 that serves a plurality of UEs 102/104/106. Network node 110 obtains a PWS message 120 that is to be delivered to devices in the area. In this example, PWS message 120 is a notification about an earthquake. Network node 110 also obtains associated area information, indicating an area for which the message is relevant. In this example, the area involves certain parts of a metropolitan area and some rural areas, and the area information is rather complex and the size of the area information is larger than normal. Network node 110 determines how many SIBs will be needed for sending the area information, which in this case, will be multiple SIBs. Network node 110 then segments PWS message 120 into a number of segments, based on how many SIBs are needed for transmitting the area information.

In some scenarios, such as in this scenario, there is a minimum size of a segment of a PWS message, such as one byte. If the area information is large, the number of portions or segments of the area information may be large (e.g., 32 segments). If the size of the PWS message is smaller than 32 bytes, it would not be possible to segment the PWS message and the area information such that the number of segments for the PWS message $N_m$ is equal to or larger than the number of segments for the area information $N_a$.

Returning to the example in FIG. 1, network node 110 then transmits PWS message 120 segments in multiple SIBs. In the embodiment, shown by FIG. 1, multiple SIBs 122/124/126 each include an area information portion that is accompanied by a segment of PWS message 120. This ensures that the network can transmit a PWS message segment when it sends each area information segment.

UEs 102/104/106 receive the SIBs 122/124/126 and assemble the area information from the area information portions and the PWS message 120 from the message segments. Each of UEs 102/104/106, determine, from the area information, whether PWS message 120 is relevant to the UE. For example, UEs 102 and 104 determine, from the complex area information, that PWS message 120 is relevant to the user and display the earthquake notification with any accompanying information that is included in PWS message 120. On the other hand, UE 106 determines that PWS message 120 is not relevant and does not display the earthquake notification to the user.

Figure 2:
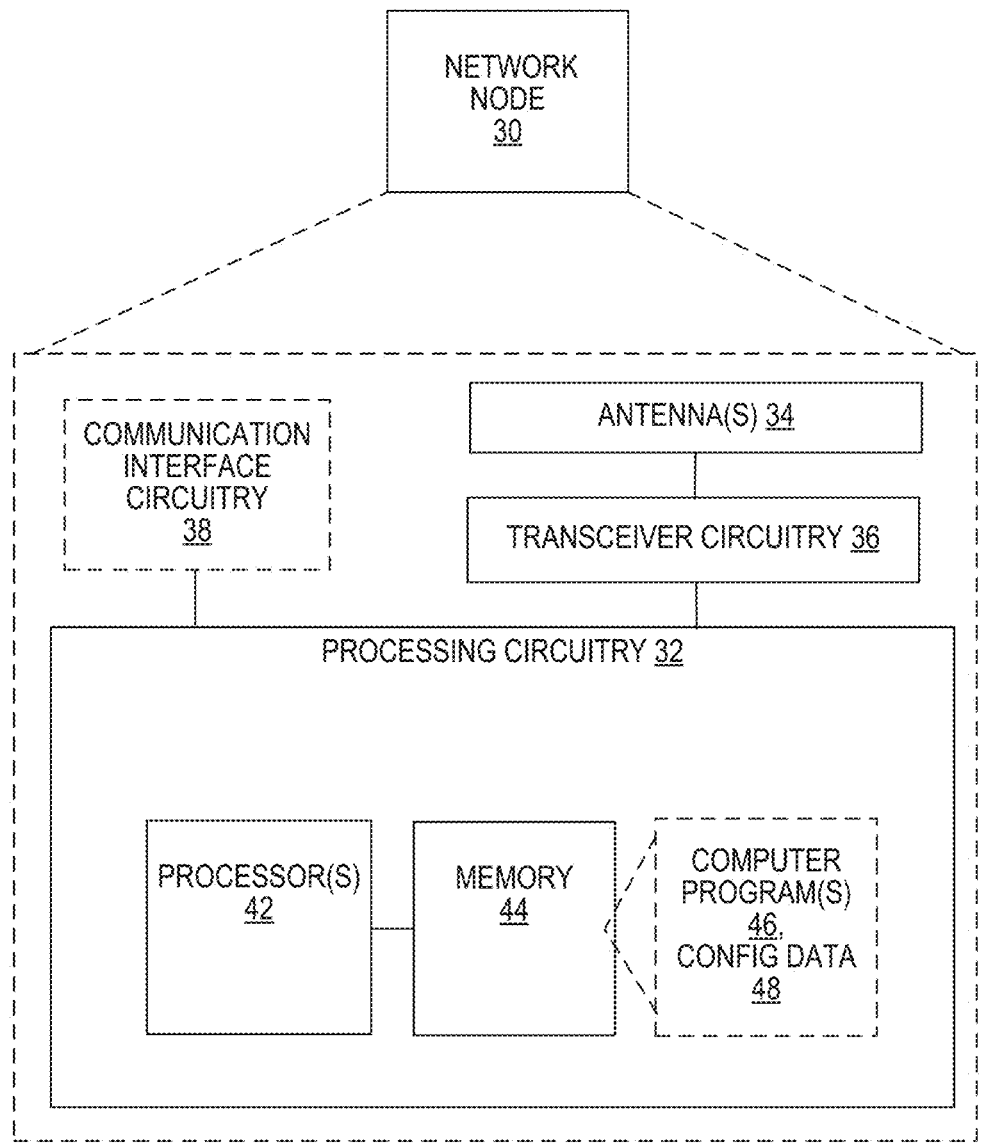
FIG. 2 illustrates a block diagram of a network node, according to some embodiments.

Accordingly, FIG. 2 shows a network node 30, which may be configured to carry out one or more of these disclosed techniques. Network node 30 may be an evolved Node B (eNodeB), Node B or gNB. While a network node 30 is shown in FIG. 2, the operations can be performed by other kinds of network access nodes, including a radio network node such as base station, radio base station, base transceiver station, base station controller, network controller, NR BS, Multi-cell/multicast Coordination Entity (MCE), relay node, access point, radio access point, Remote Radio Unit (RRU) Remote Radio Head (RRH), or a multi-standard BS (MSR BS). Network node 30 may also, in some cases, be a core network node (e.g., MME, SON node, a coordinating node, positioning node, MDT node, etc.), or even an external node (e.g., 3rd party node, a node external to the current network), etc. Network node 30 may also comprise test equipment.

In the non-limiting embodiments described below, network node 30 will be described as being configured to operate as a cellular network access node in an LTE network or NR network. In some embodiments, the technique can be implemented in the RRC layer. The RRC layer could be implemented by one or more network nodes in a cloud environment and hence some embodiments can be implemented in a cloud environment.

Those skilled in the art will readily appreciate how each type of node may be adapted to carry out one or more of the methods and signaling processes described herein, e.g., through the modification of and/or addition of appropriate program instructions for execution by processing circuits 32.

Network node 30 facilitates communication between wireless terminals (e.g., UEs), other network access nodes and/or the core network. Network node 30 may include communication interface circuitry 38 that includes circuitry for communicating with other nodes in the core network, radio nodes, and/or other types of nodes in the network for the purposes of providing data and/or cellular communication services. Network node 30 communicates with wireless devices using antennas 34 and transceiver circuitry 36. Transceiver circuitry 36 may include transmitter circuits, receiver circuits, and associated control circuits that are collectively configured to transmit and receive signals according to a radio access technology, for the purposes of providing cellular communication services.

Network node 30 also includes one or more processing circuits 32 that are operatively associated with the transceiver circuitry 36 and, in some cases, the communication interface circuitry 38. Processing circuitry 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, processing circuitry 32 may comprise fixed circuitry, or programmable circuitry that is specially configured via the execution of program instructions implementing the functionality taught herein, or some mix of fixed and programmed circuitry. Processor 42 may be multi-core, i.e., having two or more processor cores utilized for enhanced performance, reduced power consumption, and more efficient simultaneous processing of multiple tasks.

Processing circuitry 32 also includes a memory 44. Memory 44, in some embodiments, stores one or more computer programs 46 and, optionally, configuration data 48. Memory 44 provides non-transitory storage for the computer program 46 and it may comprise one or more types of computer-readable media, such as disk storage, solid-state memory storage, or any mix thereof. Here, "non-transitory" means permanent, semi-permanent, or at least temporarily persistent storage and encompasses both long-term storage in non-volatile memory and storage in working memory, e.g., for program execution. By way of non-limiting example, memory 44 comprises any one or more of SRAM, DRAM, EEPROM, and FLASH memory, which may be in processing circuitry 32 and/or separate from processing circuitry 32. Memory 44 may also store any configuration data 48 used by the network access node 30. Processing circuitry 32 may be configured, e.g., through the use of appropriate program code stored in memory 44, to carry out one or more of the methods and/or signaling processes detailed hereinafter.

Processing circuitry 32 of the network node 30 is configured, according to some embodiments, to perform the techniques described herein for one or more network nodes of a wireless communication system serving a plurality of UEs, such as for network node 110 illustrated in FIG. 1. Processing circuitry 32 is configured to obtain a message to be transmitted as a public warning system notification to multiple UEs, via one or more SIBs, and obtain area information corresponding to the message. The area information indicates an area for which the message is relevant. Processing circuitry 32 is also configured to determine how many SIBs are needed for transmitting the area information and segment the message into a plurality of segments, based on how many SIBs are needed for transmitting the area information. Processing circuitry 52 is configured to transmit, via transceiver circuitry 56, the message and the area information via SIBs, such that a segment of the message is included in each SIB and such that each portion of the area information included in a SIB is accompanied by a segment of the message.

Figure 3:
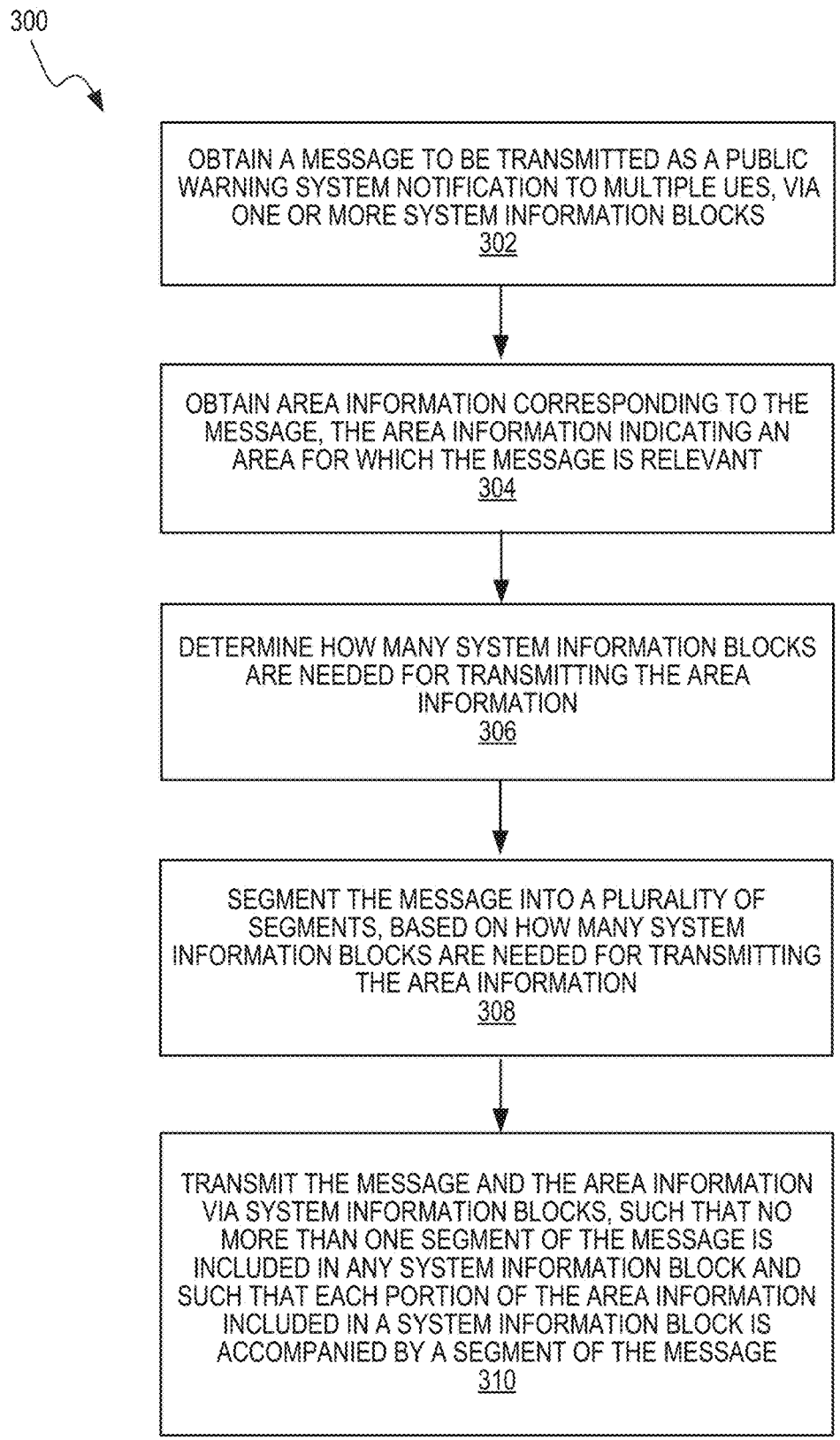
FIG. 3 illustrates a flow diagram of a method at the network node, according to some embodiments.

The processing circuitry 32 is also configured to perform a method 300, shown in FIG. 3. Method 300 includes obtaining a message to be transmitted as a public warning system notification to multiple UEs, via one or more SIBs (block 302), and obtaining area information corresponding to the message, the area information indicating an area for which the message is relevant (block 304). Method 300 also includes determining how many SIBs are needed for transmitting the area information (block 306) and segmenting the message into a plurality of segments, based on how many SIBs are needed for transmitting the area information (block 308). Method 300 further includes transmitting the message and the area information via SIBs, such that a segment of the message is included in each SIB and such that each portion of the area information included in a SIB is accompanied by a segment of the message (block 310).

In some embodiments, segmenting the message includes dividing the message into at least N segments, where N is the number of SIBs needed for transmitting the area information. Segmenting the message may include dividing the message into exactly N segments.

In another example, the network determines that PWS message 120 cannot be segmented such that $N_m$ is at least as large as $N_a$. The network may then extend/add padding to PWS message 120 such that the (extended) PWS message 120 can be segmented into a number $N_m$ which can be equal to or larger than $N_a$. The padding may be added into the actual message and network node 110 may need to understand the content and/or structure of the message. Alternatively, the padding could be added to a container which contains the PWS message, for example by adding padding to the ASN.1 coding which is used by the RRC protocol to transport the message.

Therefore, in some embodiments, segmenting the message includes determining that the message, without modification, cannot be divided into enough segments so that each portion of the area information included in a system information is accompanied by a segment, and extending the message, prior to the segmenting, so that the extended message can be divided into enough segments so that each portion of the area information included in a system information is accompanied by a segment. The message may be a container carrying notification information coded into the container. The container may be an ASN-1 container.

The SIBs may be LTE SystemInformationBlockType11 blocks or LTE SystemInformationBlockType12 blocks.

Figure 4:
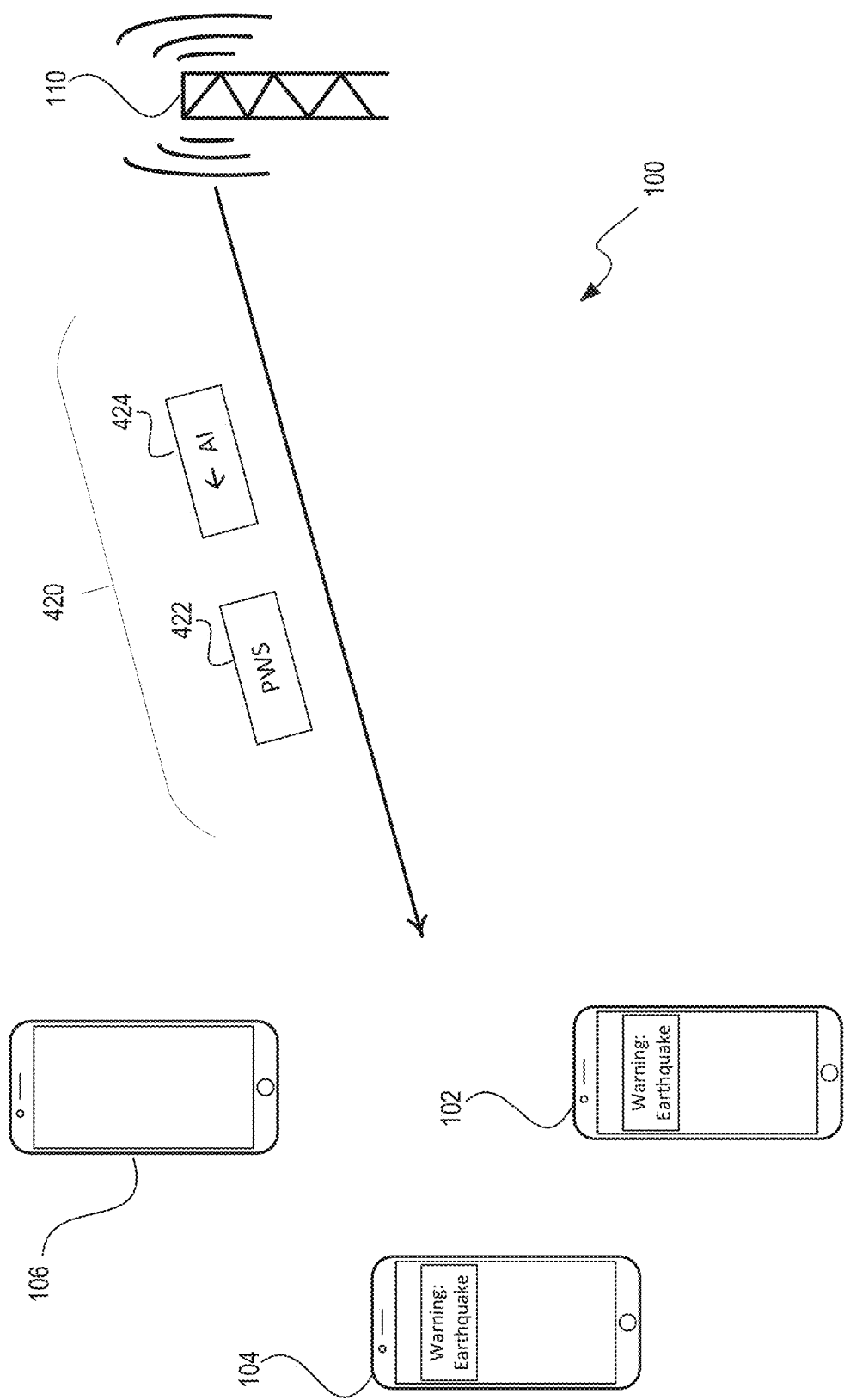
FIG. 4 illustrates another example of a network node sending a PWS message and area information to UEs in multiple segments, according to some embodiments.

In a third example, illustrated by FIG. 4, PWS message 420 is signaled in a first SIB 422, while the associated area information is signaled in a second SIB 424. First SIB 422 can be, for example, SIB12, containing a CMAS type of warning, which is already defined in LTE. Second SIB 424 can be a new SIB which is defined to contain area information associated with messages sent in SIB12.

UEs 102/104/106 would acquire first and second SIBs 422/424 and determine whether, for a PWS message in first SIB 422, there is associated area information in second SIB 424. This may be determined based on an identifier (or set of identifiers) that the network would send in first and second SIBs 422/424 so that PWS messages and area information can be linked together.

Accordingly, processing circuitry 32 may be configured to perform such techniques. Processing circuitry 32, according to some embodiments, is thus configured to obtain a message to be transmitted as a public warning system notification to multiple UEs, via one or more SIBs, and obtain area information corresponding to the message, the area information indicating an area for which the message is relevant. Processing circuitry 32 is also configured to transmit at least some of the message via a first SIB and transmit at least some of the area information via a second SIB, such that the second SIB contains linking information indicating that the included area information corresponds to the message sent via the first SIB.

Figure 5:
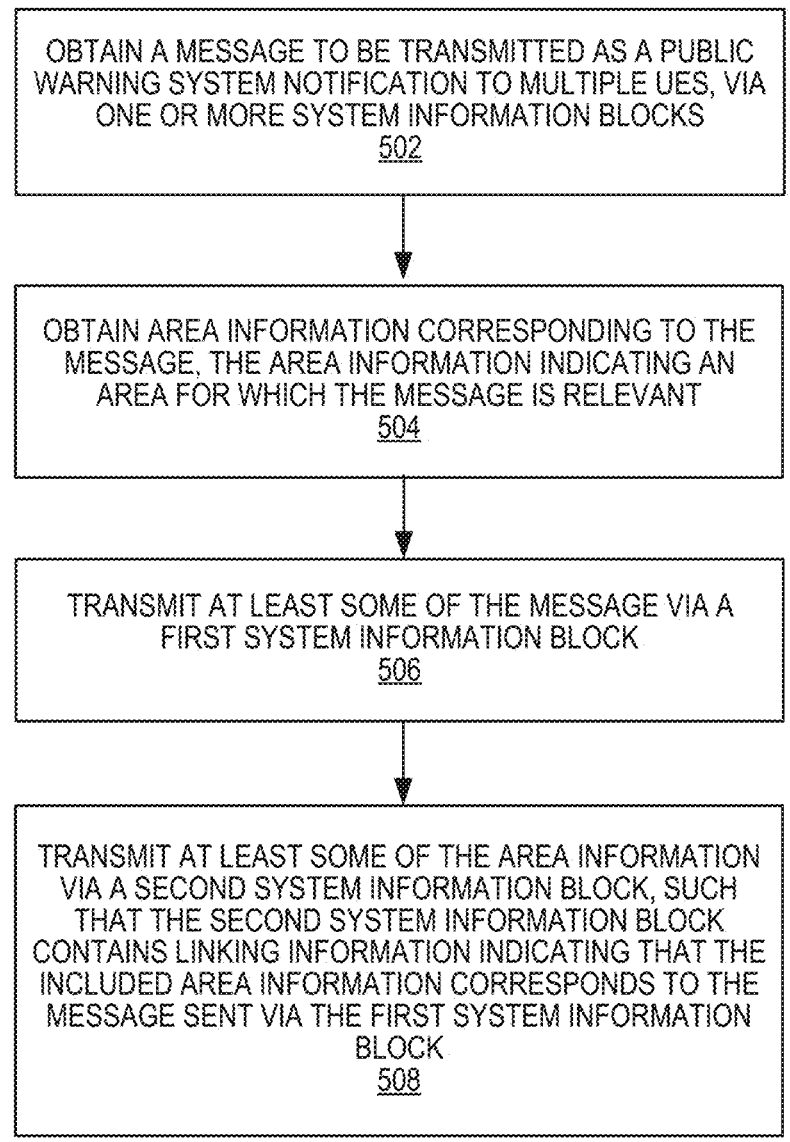
FIG. 5 illustrates a flow diagram of another method at the network node, according to some embodiments.

Processing circuitry 32 may also be configured to perform a corresponding method 500, shown in FIG. 5. Method 500 includes obtaining a message to be transmitted as a public warning system notification to multiple UEs, via one or more SIBs (block 502) and obtaining area information corresponding to the message, the area information indicating an area for which the message is relevant (block 504). Processing circuitry 32 is also configured to transmit at least some of the message via a first SIB and transmit at least some of the area information via a second SIB, such that the second SIB contains linking information indicating that the included area information corresponds to the message sent via the first SIB.

The linking information may include a message identifier or a serial number, or both, corresponding to an identical identifier or serial number, or both, in the first SIB. The first SIB may be a SystemInformationBlockType12 and the second SIB may be a different type. In some embodiments, transmitting at least some of the area information via the second SIB includes including, in the second SIB, an indication of a type for the first SIB.

In the currently defined SIB12, where PWS messages can be sent, there is a "messageIdentifier" and "serialNumber". In some embodiments, the network sends similar fields in the SIB carrying the area-information. Below is the existing SIB12 in LTE with candidate fields for the identifier shown in bold.

```
SystemInformationBlockType12-r9 ::=    SEQUENCE {
    messageIdentifier-r9                BIT STRING (SIZE (16)),
    serialNumber-r9                     BIT STRING (SIZE (16)),
    warningMessageSegmentType-r9        ENUMERATED
    {notLastSegment, lastSegment},
    warningMessageSegmentNumber-r9      INTEGER (0..63),
    warningMessageSegment-r9            OCTET STRING,
    dataCodingScheme-r9                 OCTET STRING (SIZE (1))
        OPTIONAL,   -- Cond Segment1
    lateNonCriticalExtension            OCTET STRING OPTIONAL,
    ...
}
```

Shown below is a proposed new SIB (SIBX), which provides the area information. The text in bold shows candidate fields for the identifiers. The network (e.g. eNB) may send a PWS-message in SIB12 and the associated area information in SIBX. When sending the area information for a message A, the messageIdentifier and/or serialNumber fields may be set for the area information to the same as these fields are set when sending the associated PWS message in SIB12.

```
SystemInformationBlockTypeX-r15 ::=    SEQUENCE {
    messageIdentifier-r9              BIT STRING (SIZE (16)),
    serialNumber-r9                   BIT STRING (SIZE (16)),
    warningAreaCoordinates-r15        WarningAreaCoordinates-
r15
    lateNonCriticalExtension          OCTET STRING OPTIONAL,
    ...
}
```

As an alternative, a separate identity can be added to the SIB containing the warning message and then included in the new SIB with the area information, in order to link the different warning messages with the corresponding area information. Since the number of different warning messages that can be transmitted in parallel is significantly smaller than what can be identified with 32 bits (16+16), the identity that needs to be included in the area information message can then be significantly smaller. This would leave more space in the new SIB ("SIBX") for actual area-information.

In order to support area information for the different types of PWS warning messages (ETWS primary notification, ETWS secondary notification and CMAS notification) with a single SIB ("SIBX"), an additional indication could be included in the SIBX to identify what type of PWS warning message the area information SIB is related to. For example, in LTE where the PWS warning messages are transmitted through SIB10, SIB11 and SIB12, the indication in the new SIB could identify whether it is related to a SIB10 (ETWS primary notification), a SIB11 (ETWS secondary notification) or a SIB12 (CMAS notification).

As an alternative solution to supporting SIBs with area information that can be related to the different types of warning messages (e.g., SIB10, SIB11 and SIB12 in LTE), the identities that are included in both the SIB with the warning message and in the SIB with the area information (to link the information) can be coordinated between the warning message SIBs (e.g., SIB10-SIB12). The network should then coordinate the used identities in the warning message SIBs so that each identity is only used in one of the warning message SIBs at each point in time.

Figure 6:
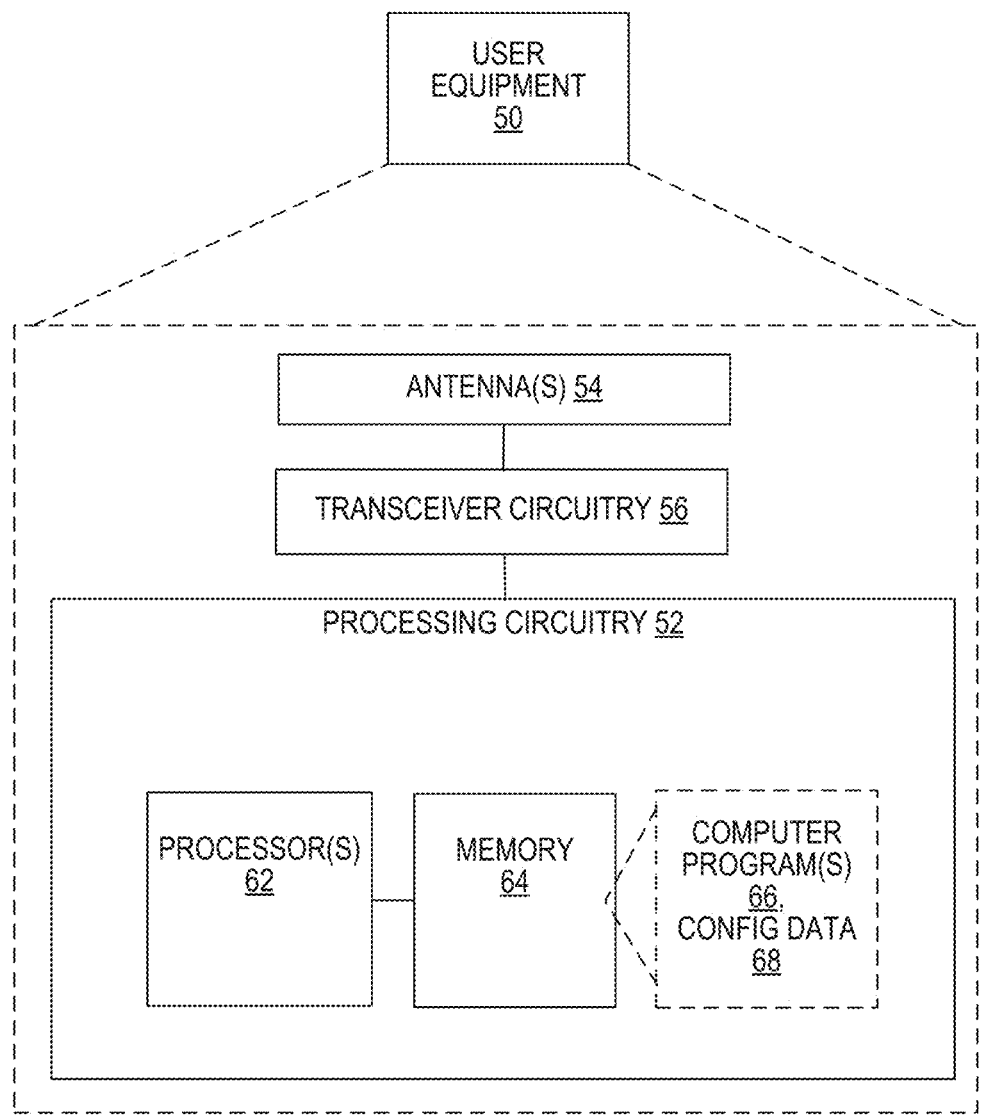
FIG. 6 illustrates is a block diagram of a UE, according to some embodiments.

An example embodiment of one of the corresponding UEs that receive the SIBs will now be described. FIG. 6 illustrates a diagram of a UE 50 configured to carry out one or more of the disclosed techniques, according to some embodiments. UE 50 may be considered to represent any wireless devices or terminals that may operate in a network, such as a UE in a cellular network. Other examples may include a communication device, target device, device to device (D2D) UE, machine type UE or UE capable of machine to machine communication (M2M), a sensor equipped with UE, PDA (personal digital assistant), tablet, IPAD tablet, mobile terminal, smart phone, laptop embedded equipped (LEE), laptop mounted equipment (LME), USB dongles, Customer Premises Equipment (CPE), etc.

UE 50 is configured to communicate with a network node or base station in a wide-area cellular network via antennas 54 and transceiver circuitry 56. Transceiver circuitry 56 may include transmitter circuits, receiver circuits, and associated control circuits that are collectively configured to transmit and receive signals according to a radio access technology, for the purposes of using cellular communication services. This radio access technologies can be NR and LTE for the purposes of this discussion.

UE 50 also includes one or more processing circuits 52 that are operatively associated with the radio transceiver circuitry 56. Processing circuitry 52 comprises one or more digital processing circuits, e.g., one or more microprocessors, microcontrollers, DSPs, FPGAs, CPLDs, ASICs, or any mix thereof. More generally, processing circuitry 52 may comprise fixed circuitry, or programmable circuitry that is specially adapted via the execution of program instructions implementing the functionality taught herein, or may comprise some mix of fixed and programmed circuitry. Processing circuitry 52 may be multi-core.

Processing circuitry 52 also includes a memory 64. Memory 64, in some embodiments, stores one or more computer programs 66 and, optionally, configuration data 68. Memory 64 provides non-transitory storage for computer program 66 and it may comprise one or more types of computer-readable media, such as disk storage, solid-state memory storage, or any mix thereof. By way of non-limiting example, memory 64 comprises any one or more of SRAM, DRAM, EEPROM, and FLASH memory, which may be in processing circuitry 52 and/or separate from processing circuitry 52. Memory 64 may also store any configuration data 68 used by UE 50. Processing circuitry 52 may be configured, e.g., through the use of appropriate program code stored in memory 64, to carry out one or more of the methods and/or signaling processes detailed hereinafter.

Processing circuitry 52 of the UE 50 is configured, according to some embodiments, to perform the technique for a UE served by the network, such as for UE 102 shown in FIG. 1. Processing circuitry 52 is configured to receive a plurality of SIBs, obtain, from each of the SIBs, a portion of area information indicating an area for which a public warning system notification is relevant, and obtain, from each of these same SIBs, a single segment of a message. Processing circuitry 52 is also configured to assemble area information from the portions of area information and assemble the message from at least the corresponding segments of the message. Processing circuitry 52 is further configured to determine, based on the area information, that the message is relevant to the UE, and display the message, in response to the determining.

Figure 7:
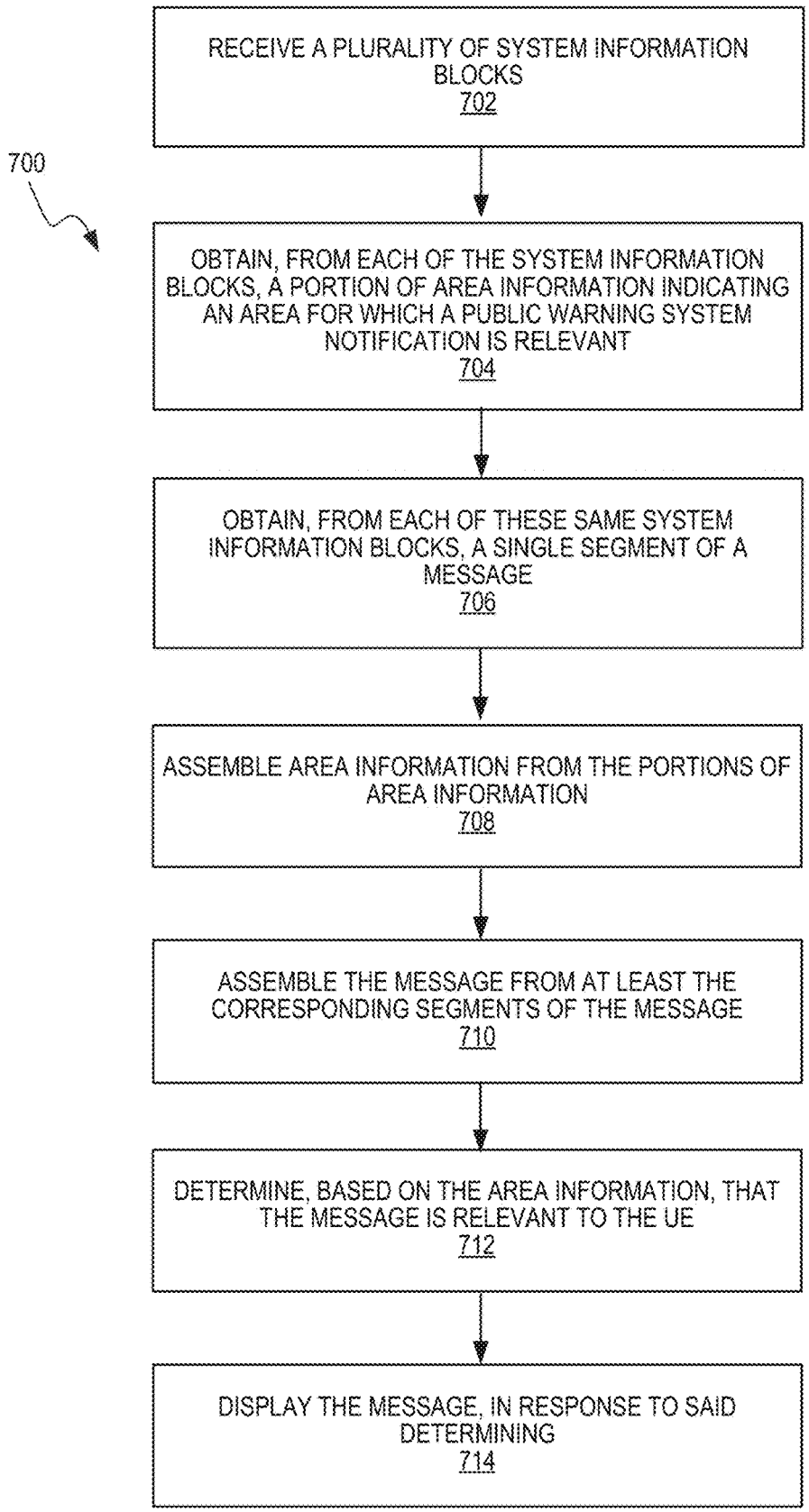
FIG. 7 illustrates a flow diagram of a method at the UE, according to some embodiments.

Processing circuitry 52 may be configured to perform a corresponding method 700, shown in FIG. 7. Method 700 includes receiving a plurality of SIBs (block 702), obtaining, from each of the SIBs, a portion of area information indicating an area for which a public warning system notification is relevant (block 704) and obtaining, from each of these same SIBs, a single segment of a message (block 706). Method 700 further includes assembling area information from the portions of area information (block 708) and assembling the message from at least the corresponding segments of the message (block 710). Method 700 then includes determining, based on the area information, that the message is relevant to the UE (block 712) and displaying the message, in response to the determining (block 714).

In some embodiments, assembling the message includes assembling the message from the portions of the message included in the plurality of SIBs and at least one message portion included in an additional SIB. The SIBs may be LTE SystemInformationBlockType11 blocks or LTE SystemInformationBlockType12 blocks.

In other embodiments, processing circuitry 52 is configured to perform the technique described for UE 102 in FIG. 4. Processing circuitry 52 is configured to receive at least a portion of a public warning system notification message via a first SIB and receive at least a portion of area information via a second SIB. Processing circuitry 52 is also configured to determine, based on linking information included in the second SIB, that the area information included in the second SIB corresponds to the message received via the first SIB, and determine, based on the area information, that the message is relevant to the UE. Processing circuitry 52 is configured to then display the message, in response to the determining.

Figure 8:
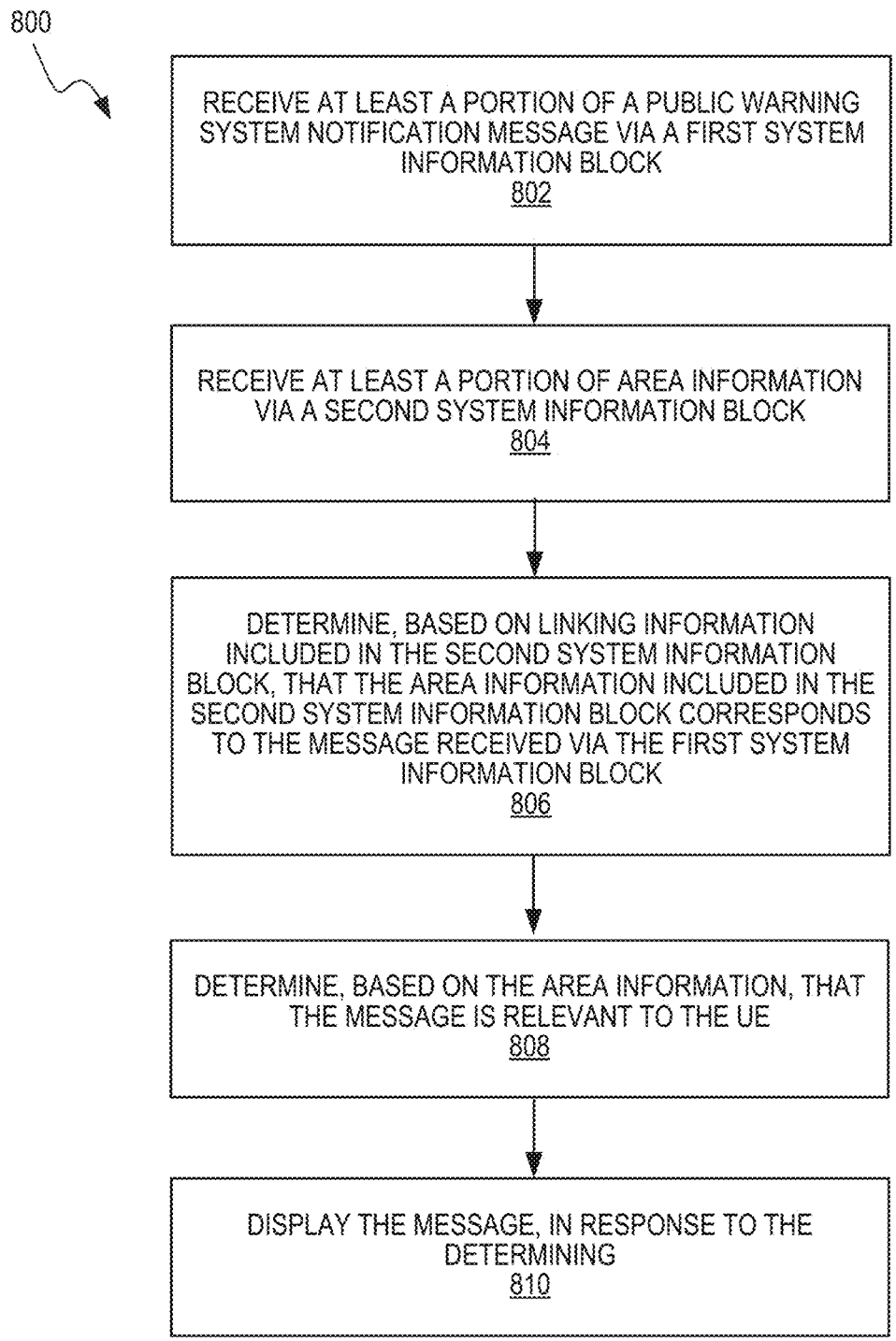
FIG. 8 illustrates a flow diagram of another method at the UE, according to some embodiments.

Processing circuitry 52 may be configured to perform a corresponding method 800, shown in FIG. 8. Method 800 includes receiving at least a portion of a public warning system notification message via a first SIB (block 802) and receiving at least a portion of area information via a second SIB (block 804). Method 800 further includes determining, based on linking information included in the second SIB, that the area information included in the second SIB corresponds to the message received via the first SIB (block 806), and determining, based on the area information, that the message is relevant to the UE (block 808). Method 800 then includes displaying the message, in response to the determining (block 810).

The linking information may include a message identifier or a serial number, or both, corresponding to an identical identifier or serial number, or both, in the first SIB. The first SIB may be a SystemInformationBlockType12 and the second SIB may be a different type. The linking information may include an indication of a type for the first SIB.

Figure 9:
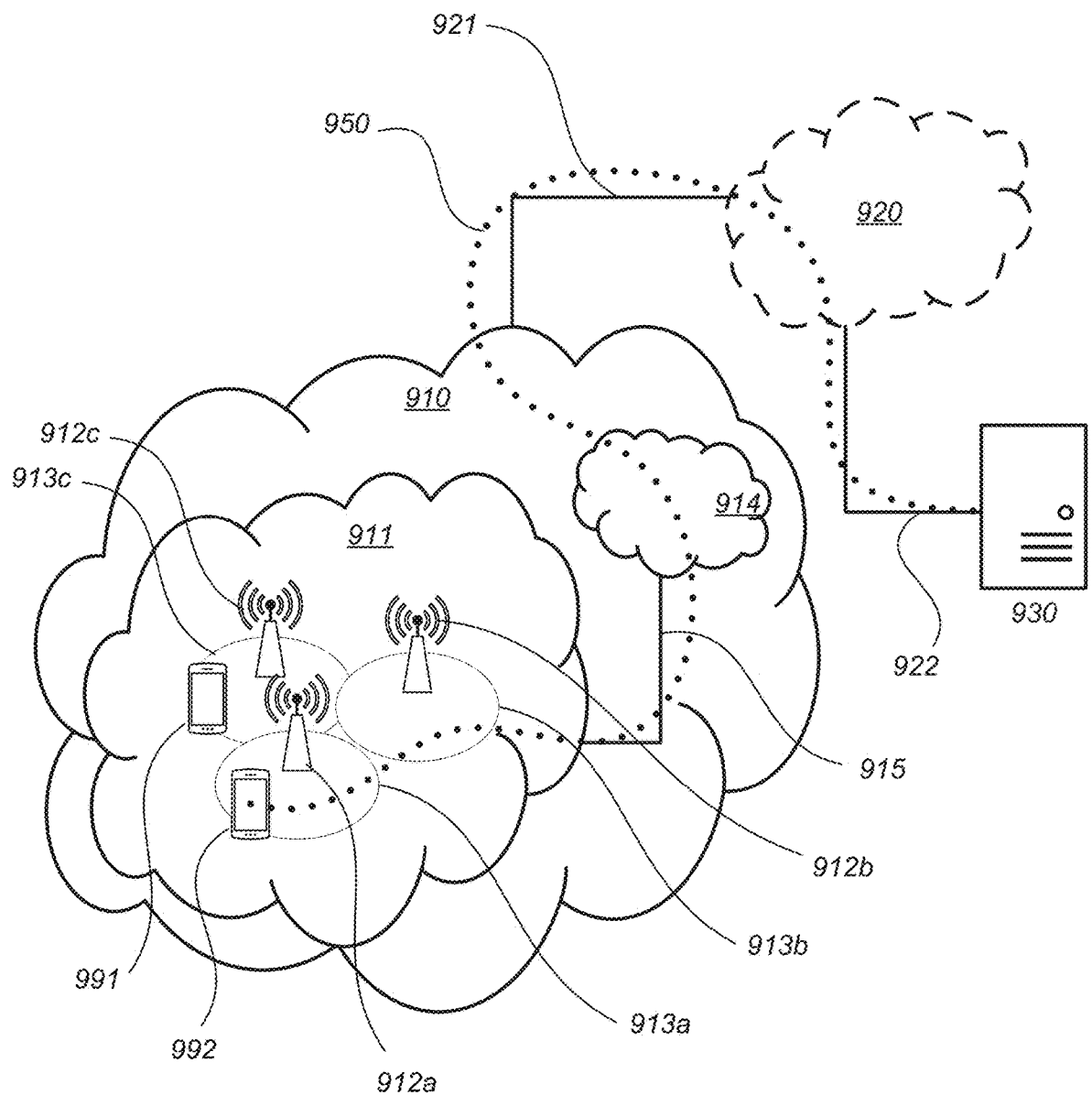
FIG. 9 schematically illustrates a telecommunication network connected via an intermediate network to a host computer, according to some embodiments.

FIG. 9, according to some embodiments, illustrates a communication system that includes a telecommunication network 910, such as a 3GPP-type cellular network, which comprises an access network 911, such as a radio access network, and a core network 914. The access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to the core network 914 over a wired or wireless connection 915. A first UE 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. The connections 921, 922 between the telecommunication network 910 and the host computer 930 may extend directly from the core network 99 to the host computer 930 or may go via an optional intermediate network 920. The intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system of FIG. 9 as a whole enables connectivity between one of the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 99, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, a base station 912 may not or need not be informed about the past routing of an incoming downlink communication with data originating from a host computer 930 to be forwarded (e.g., handed over) to a connected UE 991. Similarly, the base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as a UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with a UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

Figure 10:
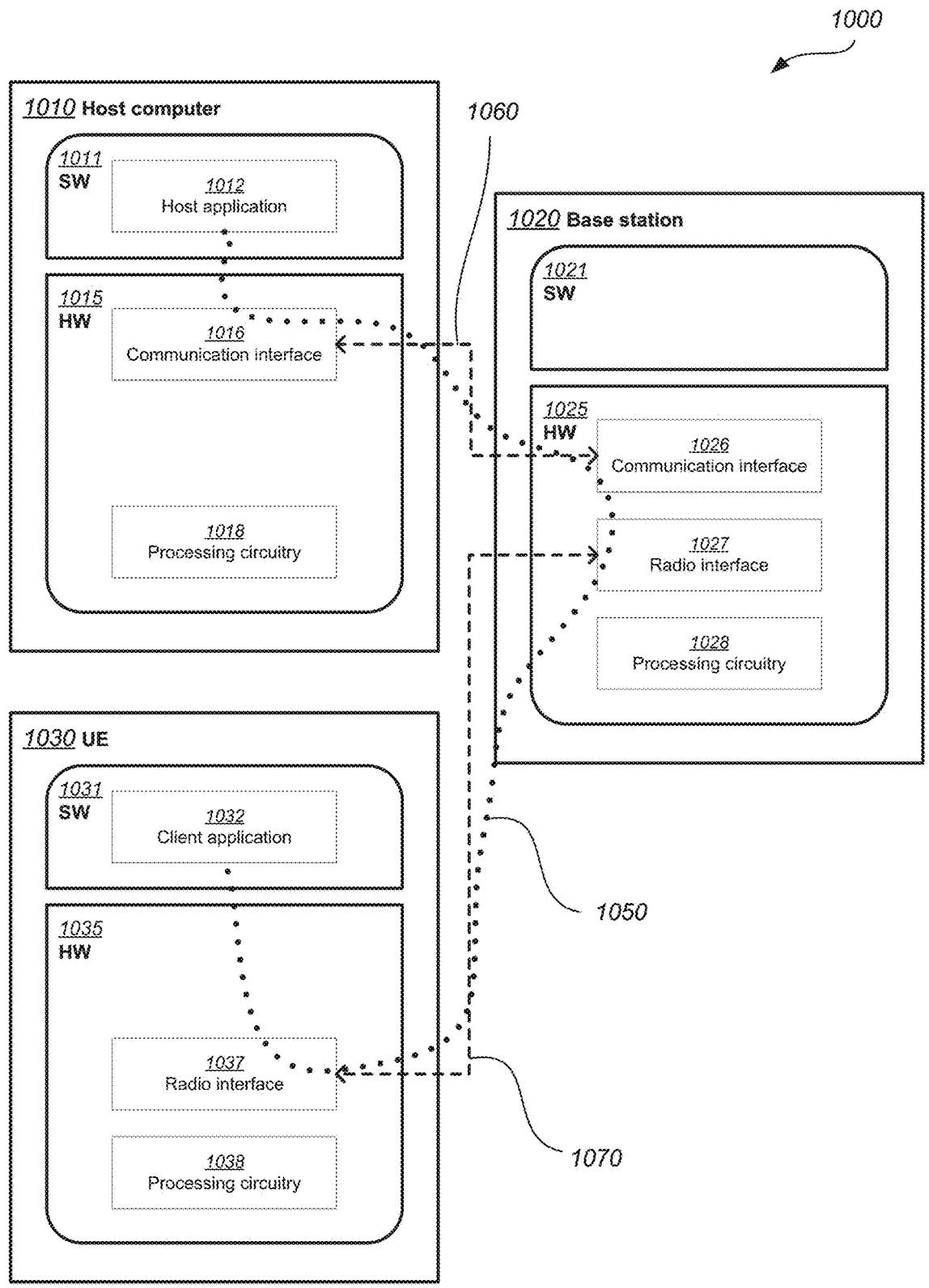
FIG. 10 is a generalized block diagram of a host computer communicating via a base station with a user equipment over a partially wireless connection, according to some embodiments.

It is noted that the host computer 1010, base station 1020 and UE 1030 illustrated in FIG. 10 may be identical to the host computer 930, one of the base stations 912*a*, 912*b*, 912*c* and one of the UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the use equipment 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

The wireless connection 1070 between the UE 1030 and the base station 1020 is in accordance with the teachings of the embodiments described throughout this disclosure, such as provided by nodes such as UE 50 and network node 30, along with the corresponding methods 300, 500, 700 and 800. The embodiments described herein enable a network node to account for the sizes of the PWS message and area information when transmitting the PWS message and area information via system information. The PWS messages and their associated area information can be segmented such that they can be sent to UEs via the system information. The teachings of these embodiments may improve the data rate, capacity, latency and/or power consumption for the network and UE 1030 using the OTT connection 1050 for emergency warning systems and thereby provide benefits such as more efficient and targeted emergency messaging that saves on network and UE resources while improving the ability of users to take safe action.

A measurement procedure may be provided for the purpose of monitoring data rate, latency and other factors on which the one or more embodiments improve. There may further be an optional network functionality for reconfiguring the OTT connection 1050 between the host computer 1010 and UE 1030, in response to variations in the measurement results. The measurement procedure and/or the network functionality for reconfiguring the OTT connection 1050 may be implemented in the software 1011 of the host computer 1010 or in the software 1031 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer's 1010 measurements of throughput, propagation times, latency and the like. The measurements may be implemented in that the software 1011, 1031 causes messages to be transmitted, in particular empty or 'dummy' messages, using the OTT connection 1050 while it monitors propagation times, errors etc.

Figure 11:
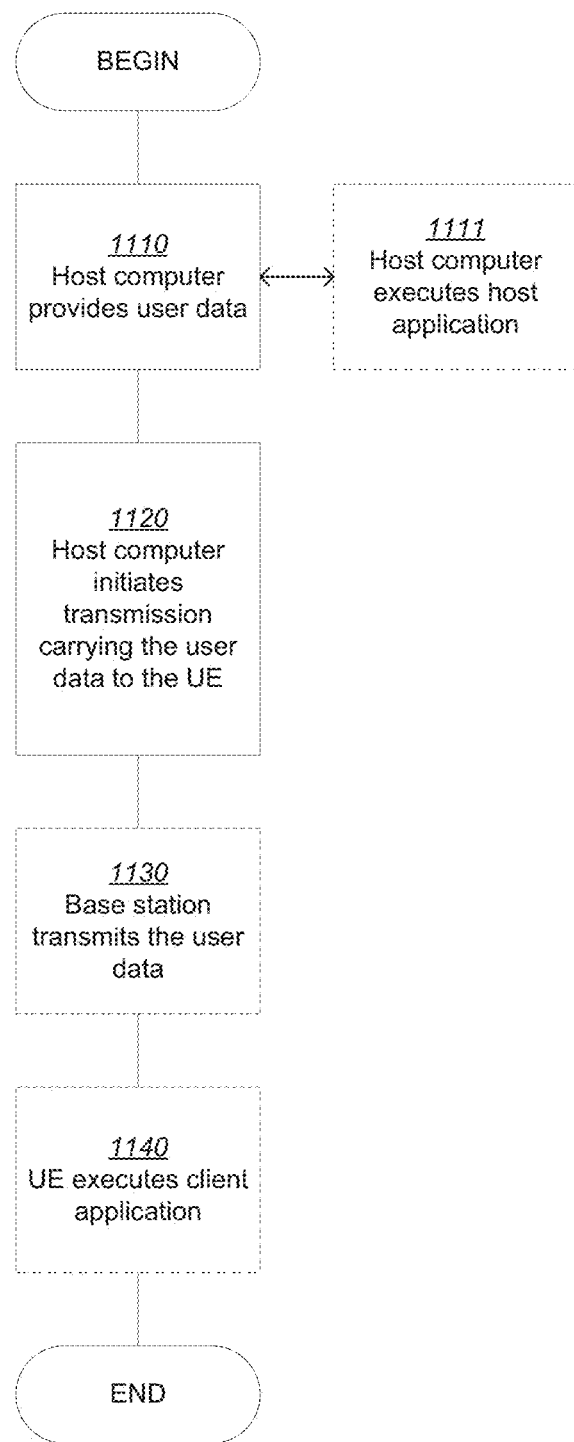
FIGS. 11 to 14 are flowcharts illustrating example methods implemented in a communication system including a host computer, a base station and a user equipment.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In a first step 1110 of the method, the host computer provides user data. In an optional substep 1111 of the first step 1110, the host computer provides the user data by executing a host application. In a second step 1120, the host computer initiates a transmission carrying the user data to the UE. In an optional third step 1130, the base station transmits to the UE the user data which was carried in the transmission that the host computer initiated, in accordance with the teachings of the embodiments described throughout this disclosure. In an optional fourth step 1140, the UE executes a client application associated with the host application executed by the host computer.

Figure 12:
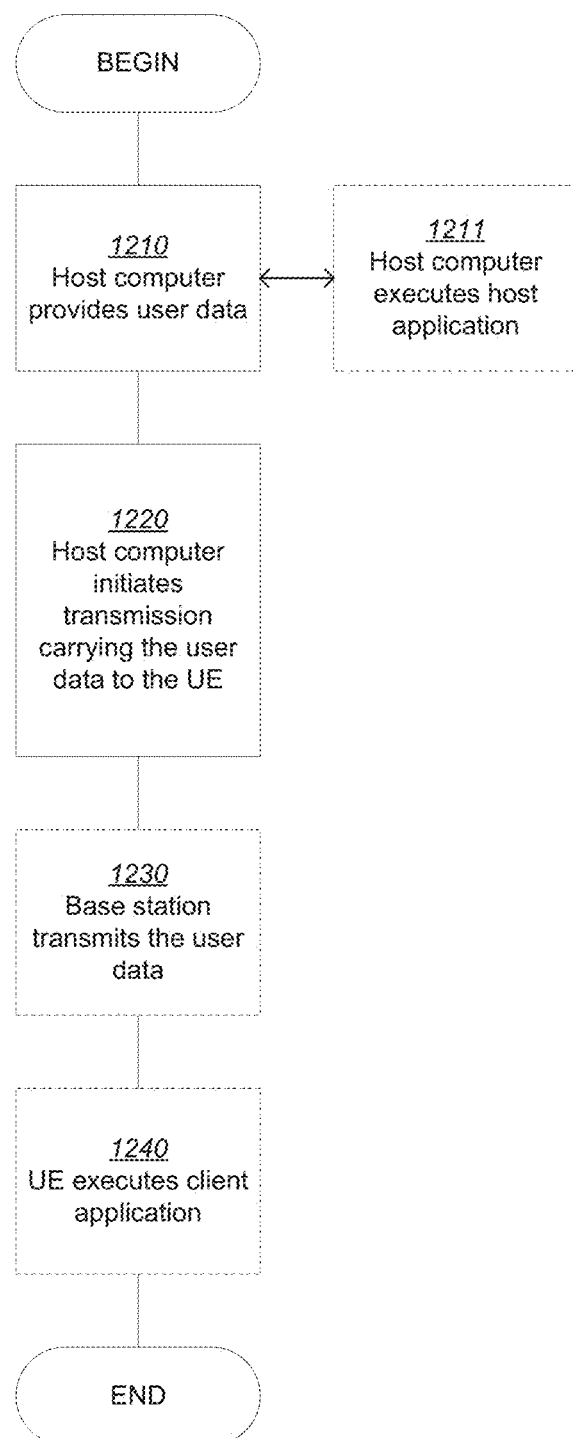

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In a first step 1210 of the method, the host computer provides user data. In an optional substep (not shown) the host computer provides the user data by executing a host application. In a second step 1220, the host computer initiates a transmission carrying the user data to the UE. The transmission may pass via the base station, in accordance with the teachings of the embodiments described throughout this disclosure. In an optional third step 1230, the UE receives the user data carried in the transmission.

Figure 13:
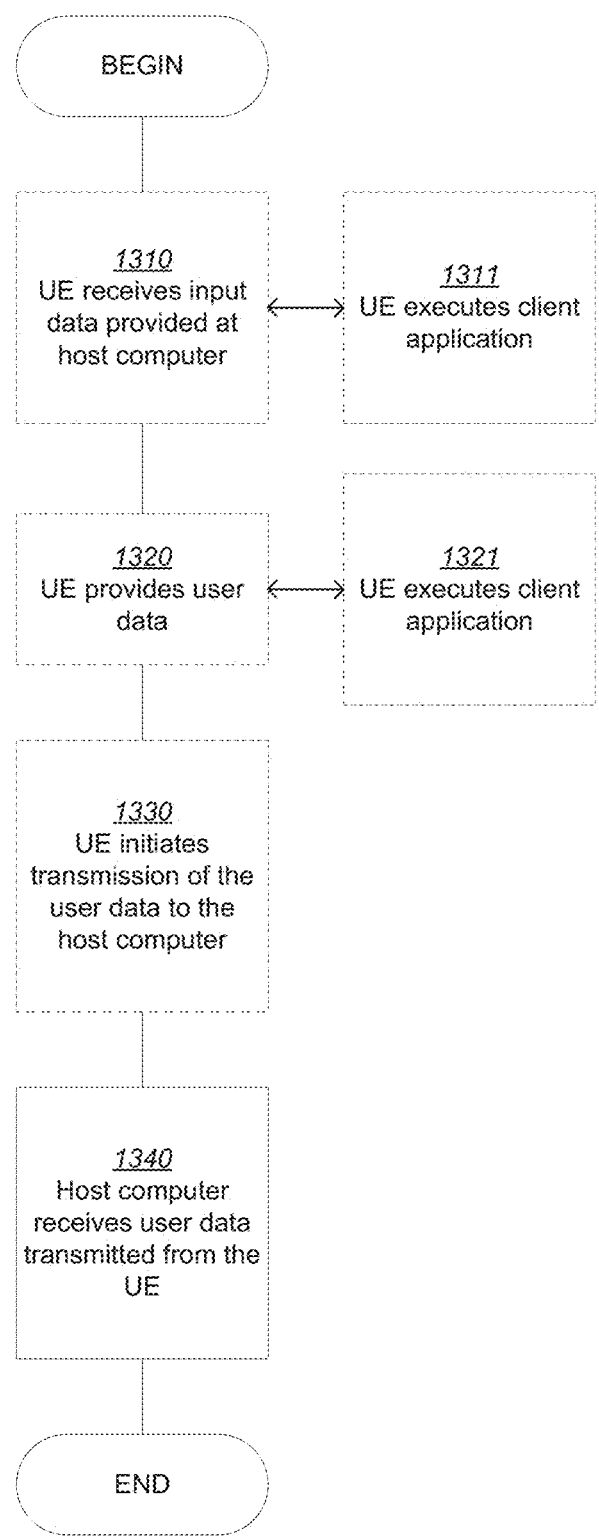

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In an optional first step 1310 of the method, the UE receives input data provided by the host computer. Additionally, or alternatively, in an optional second step 1320, the UE provides user data. In an optional substep 1321 of the second step 1320, the UE provides the user data by executing a client application. In a further optional substep 1311 of the first step 1310, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1330, transmission of the user data to the host computer. In a fourth step 1340 of the method, the host computer receives the user data transmitted from the UE, in accordance with the teachings of the embodiments described throughout this disclosure.

Figure 14:
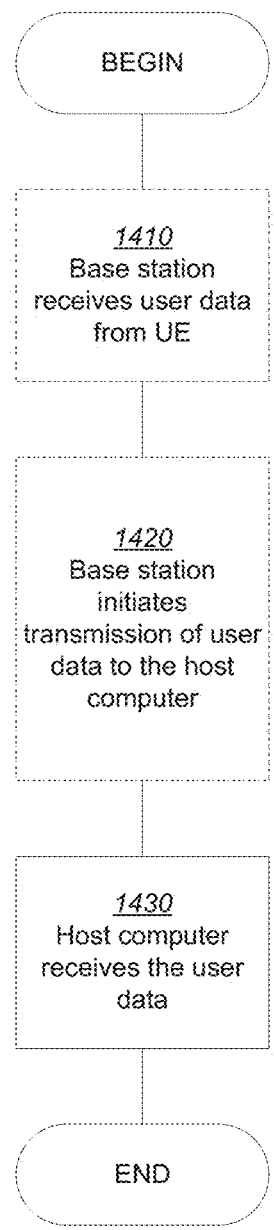

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In an optional first step 1410 of the method, in accordance with the teachings of the embodiments described throughout this disclosure, the base station receives user data from the UE. In an optional second step 1420, the base station initiates transmission of the received user data to the host computer. In a third step 1430, the host computer receives the user data carried in the transmission initiated by the base station.

As discussed in detail above, the techniques described herein, e.g., as illustrated in the process flow diagrams of FIGS. 3, 5, 7 and 8, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 15:
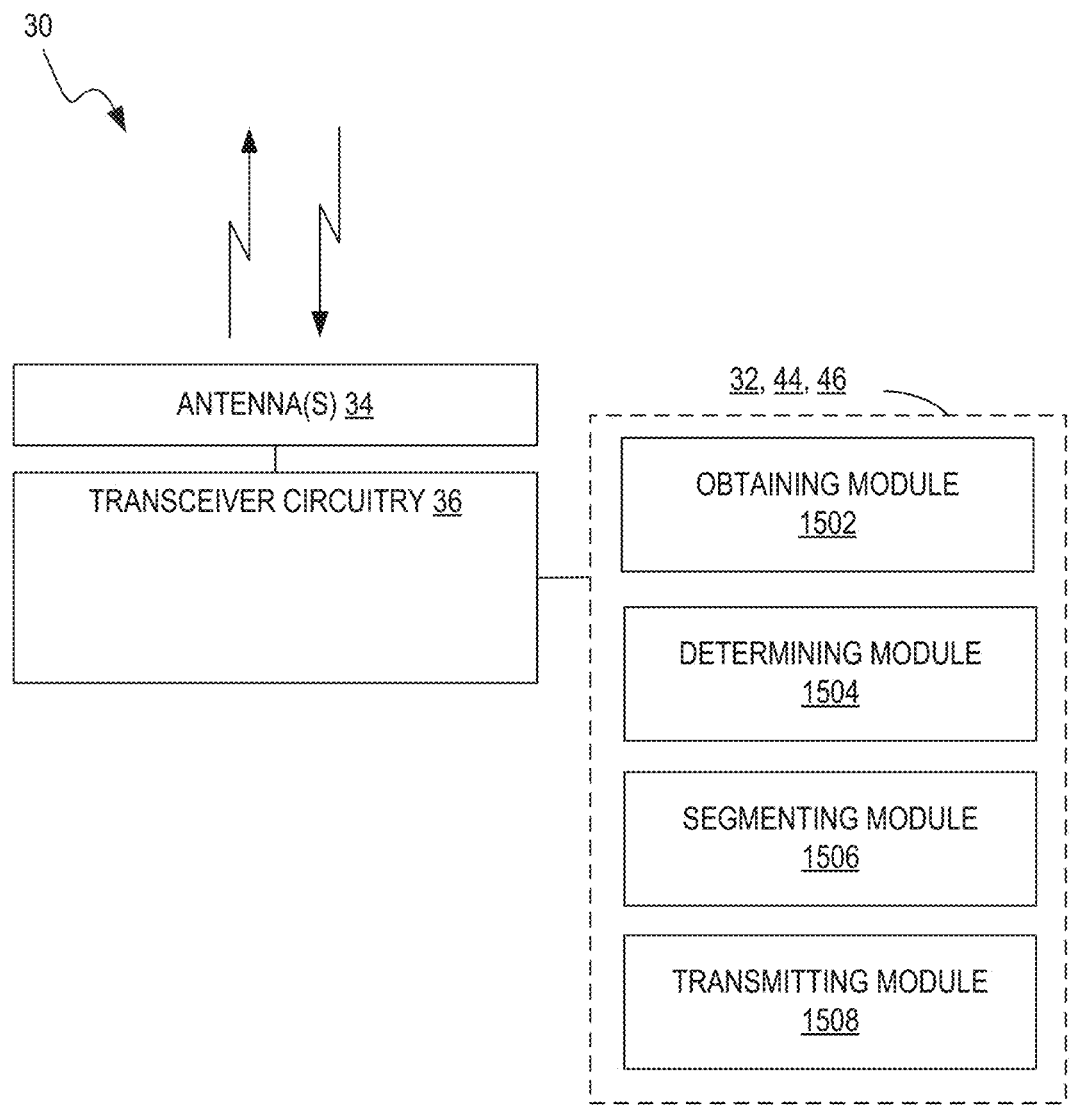
FIG. 15 is a block diagram illustrating a functional implementation of a network node, according to some embodiments.

FIG. 15 illustrates an example functional module or circuit architecture for a network node, such as network node 30. The functional implementation includes an obtaining module 1502 for obtaining a message to be transmitted as a public warning system notification to multiple UEs, via one or more SIBs and obtaining area information corresponding to the message, the area information indicating an area for which the message is relevant. The implementation includes a determining module 1504 for determining how many SIBs are needed for transmitting the area information and a segmenting module 1506 for segmenting the message into a plurality of segments, based on how many SIBs are needed for transmitting the area information. The implementation includes a transmitting module 1508 for transmitting the message and the area information via SIBs, such that a segment of the message is included in each SIB and such that each portion of the area information included in a SIB is accompanied by a segment of the message.

In another example functional implementation for the network node, the obtaining module 1502 is for obtaining a message to be transmitted as a public warning system notification to multiple UEs, via one or more SIBs and for obtaining area information corresponding to the message, the area information indicating an area for which the message is relevant. The transmitting module 1508 is for transmitting at least some of the message via a first SIB and transmitting at least some of the area information via a second SIB, such that the second SIB contains linking information indicating that the included area information corresponds to the message sent via the first SIB.

Figure 16:
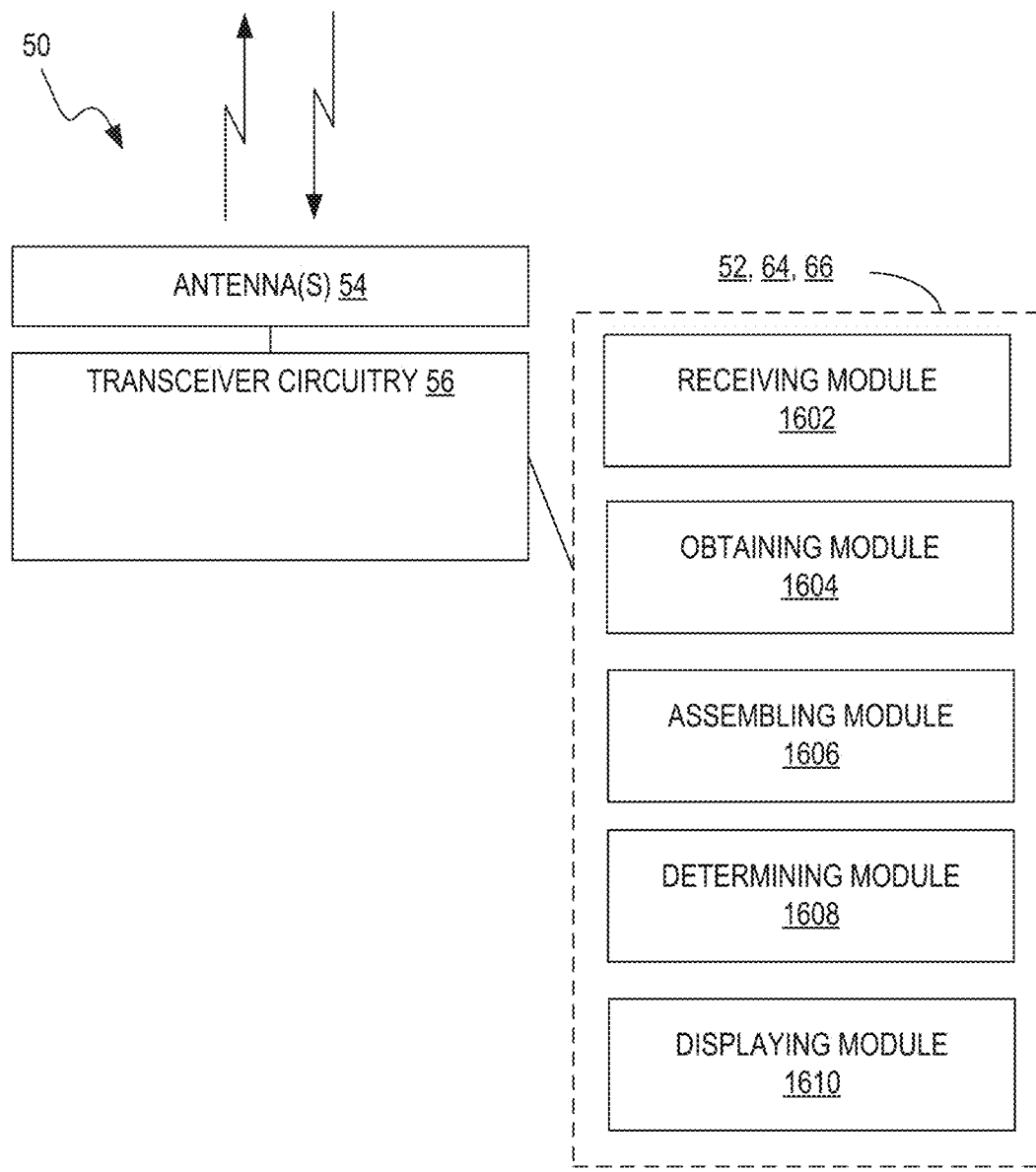
FIG. 16 is a block diagram illustrating a functional implementation of a UE, according to some embodiments.

FIG. 16 illustrates an example functional module or circuit architecture for UE 50 that includes a receiving module 1602 for receiving a plurality of SIBs and an obtaining module 1604 for obtaining, from each of the SIBs, a portion of area information indicating an area for which a public warning system notification is relevant and obtaining, from each of these same SIBs, a single segment of a message. The implementation includes an assembling module 1606 for assembling area information from the portions of area information and assembling the message from at least the corresponding segments of the message. The determining module 1608 is for determining, based on the area information, that the message is relevant to the UE and the displaying module 1610 is for displaying the message, in response to the determining.

In another functional implementation for the UE, the receiving module 1602 is for receiving at least a portion of a public warning system notification message via a first SIB and receiving at least a portion of area information via a second SIB. The determining module 1608 is for determining, based on linking information included in the second SIB, that the area information included in the second SIB corresponds to the message received via the first SIB, and determining, based on the area information, that the message is relevant to the UE. The displaying module 1610 is for displaying the message, in response to the determining.

EXAMPLE EMBODIMENTS

Example embodiments can include, but are not limited to, the following enumerated examples:

(i). A method, in at least one network node of a wireless communication system serving a plurality of user equipments (UEs), the method comprising:
   obtaining a message to be transmitted as a public warning system notification to multiple UEs, via one or more system information blocks;
   obtaining area information corresponding to the message, the area information indicating an area for which the message is relevant;
   determining how many system information blocks are needed for transmitting the area information;
   segmenting the message into a plurality of segments, based on how many system information blocks are needed for transmitting the area information; and
   transmitting the message and the area information via system information blocks, such that no more than one segment of the message is included in any system information block and such that each portion of the area information included in a system information block is accompanied by a segment of the message.

(ii). The method of example embodiment (i), wherein segmenting the message comprises dividing the message into at least N segments, where N is the number of system information blocks needed for transmitting the area information.

(iii). The method of example embodiment (ii), wherein segmenting the message comprises dividing the message into exactly N segments.

(iv). The method of example embodiment (i), wherein segmenting the message comprises:
  determining that the message, without modification, cannot be divided into enough segments so that each portion of the area information included in a system information is accompanied by a segment; and
  extending the message, prior to said segmenting, so that the extended message can be divided into enough segments so that each portion of the area information included in a system information is accompanied by a segment.

(v). The method of any of example embodiments (i-iv), wherein the message is a container carrying notification information coded into the container.

(vi). The method of example embodiment (v), wherein the container is an ASN-1 container.

(vii). The method of any of example embodiments (i-vi), wherein the system information blocks are LTE SystemInformationBlockType11 blocks or LTE SystemInformationBlockType12 blocks.

(viii). A method, in at least one network node of a wireless communication system serving a plurality of user equipments (UEs), the method comprising:
  obtaining a message to be transmitted as a public warning system notification to multiple UEs, via one or more system information blocks;
  obtaining area information corresponding to the message, the area information indicating an area for which the message is relevant;
  transmitting at least some of the message via a first system information block; and
  transmitting at least some of the area information via a second system information block, such that the second system information block contains linking information indicating that the included area information corresponds to the message sent via the first system information block.

(ix). The method of example embodiment (viii), wherein the linking information comprises a message identifier or a serial number, or both, corresponding to an identical identifier or serial number, or both, in the first system information block.

(x). The method of example embodiment (viii) or (ix), wherein the first system information block is a SystemInformationBlockType12 and the second system information block is a different type.

(xi). The method of any of example embodiments (viii)-(x), wherein transmitting at least some of the area information via the second system information block comprises including, in the second system information block, an indication of a type for the first system information block.

(xii). A method, in a user equipment (UE) served by a wireless communication network, the method comprising:
  receiving a plurality of system information blocks;
  obtaining, from each of the system information blocks, a portion of area information indicating an area for which a public warning system notification is relevant;
  obtaining, from each of these same system information blocks, a single segment of a message;
  assembling area information from the portions of area information;
  assembling the message from at least the corresponding segments of the message;
  determining, based on the area information, that the message is relevant to the UE; and
  displaying the message, in response to said determining.

(xiii). The method of example embodiment (xii), wherein assembling the message comprises assembling the message from the portions of the message included in the plurality of system information blocks and at least one message portion included in an additional system information block.

(xi). The method of example embodiment (xii) or (xiii), wherein the system information blocks are LTE SystemInformationBlockType11 blocks or LTE SystemInformationBlockType12 blocks.

(xv). A method, in a user equipment (UE) served by a wireless communication network, the method comprising:
  receiving at least a portion of a public warning system notification message via a first system information block;
  receiving at least a portion of area information via a second system information block;
  determining, based on linking information included in the second system information block, that the area information included in the second system information block corresponds to the message received via the first system information block;
  determining, based on the area information, that the message is relevant to the UE; and
  displaying the message, in response to said determining.

(xvi). The method of example embodiment (xv), wherein the linking information comprises a message identifier or a serial number, or both, corresponding to an identical identifier or serial number, or both, in the first system information block.

(xvii). The method of example embodiment (xv) or (xvi), wherein the first system information block is a SystemInformationBlockType12 and the second system information block is a different type.

(xviii). The method of any of example embodiments (xv)-(xvii), wherein the linking information includes an indication of a type for the first system information block.

(xix). A network node adapted to perform the methods of any of example embodiments (i)-(xi).

(xx). A network node comprising transceiver circuitry and processing circuitry operatively associated with the transceiver circuitry and configured to perform the methods of any of example embodiments (i)-(xi).

(xxi). A user equipment adapted to perform the methods of any of example embodiments (xii)-(xviii).

(xxii). A user equipment comprising transceiver circuitry and processing circuitry operatively associated with the transceiver circuitry and configured to perform the methods of any of example embodiments (xii)-(xviii).

(xxiii). A computer program comprising instructions that, when executed on at least one processing circuit, cause the at least one processing circuit to carry out the method according to any one of example embodiments (i)-(xviii).

(xxiv). A carrier containing the computer program of example embodiment (xxiii), wherein the carrier is one of an electronic signal, optical signal, radio signal, or computer readable storage medium.

(xxv). A communication system including a host computer comprising:

processing circuitry configured to provide user data; and
a communication interface configured to forward the user data to a cellular network for transmission to a user equipment (UE),
wherein the cellular network comprises a base station configured to:
   obtain a message to be transmitted as a public warning system notification to multiple UEs, via one or more system information blocks;
   obtain area information corresponding to the message, the area information indicating an area for which the message is relevant;
   determine how many system information blocks are needed for transmitting the area information;
   segment the message into a plurality of segments, based on how many system information blocks are needed for transmitting the area information; and
   transmit the message and the area information via system information blocks, such that no more than one segment of the message is included in any system information block and such that each portion of the area information included in a system information block is accompanied by a segment of the message.

(xxvi). A communication system including a host computer comprising:
processing circuitry configured to provide user data; and
a communication interface configured to forward the user data to a cellular network for transmission to a user equipment (UE),
wherein the cellular network comprises a base station configured to:
   obtain a message to be transmitted as a public warning system notification to multiple UEs, via one or more system information blocks;
   obtain area information corresponding to the message, the area information indicating an area for which the message is relevant;
   transmit at least some of the message via a first system information block; and
   transmit at least some of the area information via a second system information block, such that the second system information block contains linking information indicating that the included area information corresponds to the message sent via the first system information block.

(xxvii). The communication system of example embodiment (xxv) or (xxvi), further including the base station.

(xxviii). The communication system of example embodiment (xxvii), further including the UE, wherein the UE is configured to communicate with the base station.

(xxix). The communication system of example embodiment (xxviii), wherein:
   the processing circuitry of the host computer is configured to execute a host application, thereby providing the user data; and
   the UE comprises processing circuitry configured to execute a client application associated with the host application.

(xxx). A method implemented in a communication system including a host computer, a base station and a user equipment (UE), the method comprising:
at the host computer, providing user data; and
at the host computer, initiating a transmission carrying the user data to the UE via a cellular network comprising the base station, the method comprising, at the base station:
   obtaining a message to be transmitted as a public warning system notification to multiple UEs, via one or more system information blocks;
   obtaining area information corresponding to the message, the area information indicating an area for which the message is relevant;
   determining how many system information blocks are needed for transmitting the area information;
   segmenting the message into a plurality of segments, based on how many system information blocks are needed for transmitting the area information; and
   transmitting the message and the area information via system information blocks, such that no more than one segment of the message is included in any system information block and such that each portion of the area information included in a system information block is accompanied by a segment of the message.

(xxxi). A method implemented in a communication system including a host computer, a base station and a user equipment (UE), the method comprising:
at the host computer, providing user data; and
at the host computer, initiating a transmission carrying the user data to the UE via a cellular network comprising the base station, the method comprising, at the base station:
   obtaining a message to be transmitted as a public warning system notification to multiple UEs, via one or more system information blocks;
   obtaining area information corresponding to the message, the area information indicating an area for which the message is relevant;
   transmitting at least some of the message via a first system information block; and
   transmitting at least some of the area information via a second system information block, such that the second system information block contains linking information indicating that the included area information corresponds to the message sent via the first system information block.

(xxxii). The method of example embodiment (xxx) or (xxxi), further comprising:
at the base station, transmitting the user data.

(xxxiii). The method of example embodiment (xxxii), wherein the user data is provided at the host computer by executing a host application, the method further comprising:
at the UE, executing a client application associated with the host application.

(xxxiv). A communication system including a host computer comprising:
processing circuitry configured to provide user data; and
a communication interface configured to forward user data to a cellular network,
wherein the UE's processing circuitry configured to:
   receive a plurality of system information blocks;
   obtain, from each of the system information blocks, a portion of area information indicating an area for which a public warning system notification is relevant;
   obtain, from each of these same system information blocks, a single segment of a message;
   assemble area information from the portions of area information;
   assemble the message from at least the corresponding segments of the message;
   determine, based on the area information, that the message is relevant to the UE; and display the message, in response to said determining.

(xxxv). A communication system including a host computer comprising:
processing circuitry configured to provide user data; and
a communication interface configured to forward user data to a cellular network,
wherein the UE's processing circuitry configured to:
receive at least a portion of a public warning system notification message via a first system information block;
receive at least a portion of area information via a second system information block;
determine, based on linking information included in the second system information block, that the area information included in the second system information block corresponds to the message received via the first system information block;
determine, based on the area information, that the message is relevant to the UE; and
display the message, in response to said determining.

(xxxvi). The communication system of example embodiment (xxxiv) or (xxxv), further including the UE.

(xxxvii). The communication system of example embodiment (xxxvi), wherein the cellular network further includes a base station configured to communicate with the UE.

(xxxviii). The communication system of example embodiment (xxxvi) or (xxxvii), wherein:
the processing circuitry of the host computer is configured to execute a host application, thereby providing the user data; and
the UE's processing circuitry is configured to execute a client application associated with the host application.

(xxxix). A method implemented in a communication system including a host computer, a base station and a user equipment (UE), the method comprising:
at the host computer, providing user data; and
at the host computer, initiating a transmission carrying the user data to the UE via a cellular network comprising the base station, the method comprising, at the UE:
receiving a plurality of system information blocks;
obtaining, from each of the system information blocks, a portion of area information indicating an area for which a public warning system notification is relevant;
obtaining, from each of these same system information blocks, a single segment of a message;
assembling area information from the portions of area information;
assembling the message from at least the corresponding segments of the message;
determining, based on the area information, that the message is relevant to the UE; and
displaying the message, in response to said determining.

(xl). A method implemented in a communication system including a host computer, a base station and a user equipment (UE), the method comprising:
at the host computer, providing user data; and
at the host computer, initiating a transmission carrying the user data to the UE via a
cellular network comprising the base station, the method comprising, at the UE:
receiving at least a portion of a public warning system notification message via a first system information block;
receiving at least a portion of area information via a second system information block;
determining, based on linking information included in the second system information block, that the area information included in the second system information block corresponds to the message received via the first system information block;
determining, based on the area information, that the message is relevant to the UE; and
displaying the message, in response to said determining.

(xli). The method of example embodiment (xxxix) or (xl), further comprising:
at the UE, receiving the user data from the base station.

(xlii). A communication system including a host computer comprising:
a communication interface configured to receive user data originating from a transmission from a user equipment (UE) to a base station, wherein the UE's processing circuitry is configured to:
receive a plurality of system information blocks;
obtain, from each of the system information blocks, a portion of area information indicating an area for which a public warning system notification is relevant;
obtain, from each of these same system information blocks, a single segment of a message;
assemble area information from the portions of area information;
assemble the message from at least the corresponding segments of the message;
determine, based on the area information, that the message is relevant to the UE; and
display the message, in response to said determining.

(xliii). A communication system including a host computer comprising:
a communication interface configured to receive user data originating from a transmission from a user equipment (UE) to a base station, wherein the UE's
processing circuitry is configured to:
receive at least a portion of a public warning system notification message via a first system information block;
receive at least a portion of area information via a second system information block;
determine, based on linking information included in the second system information block, that the area information included in the second system information block corresponds to the message received via the first system information block;
determine, based on the area information, that the message is relevant to the UE; and
display the message, in response to said determining.

(xliv). The communication system of example embodiment (xlii) or (xliii), further including the UE.

(xlv). The communication system of example embodiment (xliv), further including the base station, wherein the base station comprises a radio interface configured to communicate with the UE and a communication interface configured to forward to the host computer the user data carried by a transmission from the UE to the base station.

(xlvi). The communication system of example embodiment (xliv) or (xlv), wherein:
the processing circuitry of the host computer is configured to execute a host application; and
the UE's processing circuitry is configured to execute a client application associated with the host application, thereby providing the user data.

(xlvii). The communication system of example embodiment (xliv) or (xlv), wherein:
the processing circuitry of the host computer is configured to execute a host application, thereby providing request data; and
the UE's processing circuitry is configured to execute a client application associated with the host application, thereby providing the user data in response to the request data.

(xlviii). A method implemented in a user equipment (UE), the method comprising:
receiving a plurality of system information blocks;
obtaining, from each of the system information blocks, a portion of area information indicating an area for which a public warning system notification is relevant;
obtaining, from each of these same system information blocks, a single segment of a message;
assembling area information from the portions of area information;
assembling the message from at least the corresponding segments of the message;
determining, based on the area information, that the message is relevant to the UE; and
displaying the message, in response to said determining.

(xlix). A method implemented in a user equipment (UE), the method comprising:
receiving at least a portion of a public warning system notification message via a first system information block;
receiving at least a portion of area information via a second system information block;
determining, based on linking information included in the second system information block, that the area information included in the second system information block corresponds to the message received via the first system information block;
determining, based on the area information, that the message is relevant to the UE; and
displaying the message, in response to said determining.

(l). The method of example embodiment (xlviii) or (xlix), further comprising:
providing user data; and
forwarding the user data to a host computer via the transmission to the base station.

(li). A method implemented in a communication system including a host computer, a base station and a user equipment (UE), the method comprising:
at the host computer, receiving user data transmitted to the base station from the UE, the method at the UE comprising:
receiving a plurality of system information blocks;
obtaining, from each of the system information blocks, a portion of area information indicating an area for which a public warning system notification is relevant;
obtaining, from each of these same system information blocks, a single segment of a message;
assembling area information from the portions of area information;
assembling the message from at least the corresponding segments of the message;
determining, based on the area information, that the message is relevant to the UE; and
displaying the message, in response to said determining.

(lii). A method implemented in a communication system including a host computer, a base station and a user equipment (UE), the method comprising:
at the host computer, receiving user data transmitted to the base station from the UE,
the method at the UE comprising:
receiving at least a portion of a public warning system notification message via a first system information block;
receiving at least a portion of area information via a second system information block;
determining, based on linking information included in the second system information block, that the area information included in the second system information block corresponds to the message received via the first system information block;
determining, based on the area information, that the message is relevant to the UE; and
displaying the message, in response to said determining.

(liii). The method of example embodiment (li) or (lii), further comprising:
at the UE, providing the user data to the base station.

(liv). The method of example embodiment (liii), further comprising:
at the UE, executing a client application, thereby providing the user data to be transmitted; and
at the host computer, executing a host application associated with the client application.

(lv). The method of example embodiment (liii), further comprising:
at the UE, executing a client application; and
at the UE, receiving input data to the client application, the input data being provided at the host computer by executing a host application associated with the client application,
wherein the user data to be transmitted is provided by the client application in response to the input data.

(lvi). A communication system including a host computer comprising a communication interface configured to receive user data originating from a transmission from a user equipment (UE) to a base station, the base station's processing circuitry configured to:
obtain a message to be transmitted as a public warning system notification to multiple UEs, via one or more system information blocks;
obtain area information corresponding to the message, the area information indicating an area for which the message is relevant;
determine how many system information blocks are needed for transmitting the area information;
segment the message into a plurality of segments, based on how many system information blocks are needed for transmitting the area information; and
transmit the message and the area information via system information blocks, such that no more than one segment of the message is included in any system information block and such that each portion of the area information included in a system information block is accompanied by a segment of the message.

(lvii). A communication system including a host computer comprising a communication interface configured to receive user data originating from a transmission from a user equipment (UE) to a base station, the base station's processing circuitry configured to:

obtain a message to be transmitted as a public warning system notification to multiple UEs, via one or more system information blocks;

obtain area information corresponding to the message, the area information indicating an area for which the message is relevant;

transmit at least some of the message via a first system information block; and transmit at least some of the area information via a second system information block, such that the second system information block contains linking information indicating that the included area information corresponds to the message sent via the first system information block.

(lviii). The communication system of example embodiment (lvi) or (lvii), further including the base station.

(lix). The communication system of example embodiment (lviii), further including the UE, wherein the UE is configured to communicate with the base station.

(lx). The communication system of example embodiment (lix), wherein:

the processing circuitry of the host computer is configured to execute a host application;

the UE is configured to execute a client application associated with the host application, thereby providing the user data to be received by the host computer.

(lxi). A method implemented in a communication system including a host computer, a base station and a user equipment (UE), the method comprising:

at the host computer, receiving, from the base station, user data originating from a transmission which the base station has received from the UE, the method at the base station comprising:

receiving a first one of the CQI index values;

obtaining a message to be transmitted as a public warning system notification to multiple UEs, via one or more system information blocks;

obtaining area information corresponding to the message, the area information indicating an area for which the message is relevant;

determining how many system information blocks are needed for transmitting the area information;

segmenting the message into a plurality of segments, based on how many system information blocks are needed for transmitting the area information; and transmitting the message and the area information via system information blocks, such that no more than one segment of the message is included in any system information block and such that each portion of the area information included in a system information block is accompanied by a segment of the message.

(lxii). A method implemented in a communication system including a host computer, a base station and a user equipment (UE), the method comprising:

at the host computer, receiving, from the base station, user data originating from a transmission which the base station has received from the UE, the method at the base station comprising:

obtaining a message to be transmitted as a public warning system notification to multiple UEs, via one or more system information blocks;

obtaining area information corresponding to the message, the area information indicating an area for which the message is relevant;

transmitting at least some of the message via a first system information block; and transmitting at least some of the area information via a second system information block, such that the second system information block contains linking information indicating that the included area information corresponds to the message sent via the first system information block.

(lxiii). The method of example embodiment (lxi) or (lxii), further comprising:

at the base station, receiving the user data from the UE.

(lxiv). The method of example embodiment (lxiii), further comprising:

at the base station, initiating a transmission of the received user data to the host computer.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

What is claimed is:

1. A method, in at least one network node of a wireless communication system serving a plurality of user equipments (UEs), the method comprising:

segmenting a message to be transmitted to multiple UEs, via one or more system information blocks, into a plurality of segments, based on how many system information blocks are needed for transmitting area information corresponding to the message, the area information indicating an area for which the message is relevant; and transmitting the message and the area information via system information blocks, such that no more than one segment of the message is included in any of the transmitted system information blocks and such that each portion of the area information included in a transmitted system information block is accompanied by a segment of the message.

2. The method of claim 1, wherein the message is a public warning system notification.

3. The method of claim 1, wherein segmenting the message comprises dividing the message into at least N segments, where N is the number of system information blocks needed for transmitting the area information.

4. The method of claim 3, wherein segmenting the message comprises dividing the message into exactly N segments.

5. The method of claim 1, wherein segmenting the message comprises:

determining that the message, without modification, cannot be divided into enough segments so that each portion of the area information included in a system information block is accompanied by a segment; and extending the message, prior to said segmenting, so that the extended message can be divided into enough segments so that each portion of the area information included in a system information block is accompanied by a segment.

6. The method of claim 1, wherein the message is a container carrying notification information coded into the container.

7. The method of claim 6, wherein the container is an Abstract Syntax Notation One (ASN.1) container.

8. The method of claim 1, wherein the system information blocks are LTE SystemInformationBlockType11 blocks or LTE SystemInformationBlockType12 blocks.

9. A method, in at least one network node of a wireless communication system serving a plurality of user equipments (UEs), the method comprising:
    obtaining a message to be transmitted as a public warning system notification to multiple UEs, via one or more system information blocks;
    obtaining area information corresponding to the message, the area information indicating an area for which the message is relevant;
    transmitting, via a first system information block, at least some of a message to be transmitted as a public warning system notification to multiple UEs via one or more system information blocks; and
    transmitting, via a second system information block, at least some of area information corresponding to the message, the area information indicating an area for which the message is relevant, such that the second system information block contains linking information indicating that the included area information corresponds to the message sent via the first system information block.

10. The method of claim 9, wherein the linking information comprises a message identifier or a serial number, or both, corresponding to an identical identifier or serial number, or both, in the first system information block.

11. The method of claim 9, wherein the first system information block is a SystemInformationBlockType12 and the second system information block is a different type.

12. The method of claim 9, wherein transmitting at least some of the area information via the second system information block comprises including, in the second system information block, an indication of a type for the first system information block.

13. A method, in a user equipment (UE) served by a wireless communication network, the method comprising:
    obtaining, from each of a plurality of system information blocks, a portion of area information indicating an area for which a public warning system notification is relevant;
    obtaining, from each of these same system information blocks, a segment of a message;
    determining, based on area information assembled from the portions of area information, that the message is relevant to the UE; and
    displaying the message, in response to said determining.

14. The method of claim 13, wherein the method comprises assembling the message from the portions of the message included in the plurality of system information blocks and at least one message portion included in an additional system information block.

15. The method of claim 13, wherein the system information blocks are LTE SystemInformationBlockType11 blocks or LTE SystemInformationBlockType12 blocks.

16. A method, in a user equipment (UE) served by a wireless communication network, the method comprising:
    receiving first and second system information blocks;
    determining, based on linking information included in the second system information block, that area information included in the second system information block corresponds to a message received via the first system information block;
    determining, based on the area information, that the message is relevant to the UE; and
    displaying the message, in response to said determining.

17. The method of claim 16, wherein the linking information comprises a message identifier or a serial number, or both, corresponding to an identical identifier or serial number, or both, in the first system information block.

18. The method of claim 16, wherein the first system information block is a SystemInformationBlockType12 and the second system information block is a different type.

19. The method of claim 16, wherein the linking information includes an indication of a type for the first system information block.

* * * * *

UNITED STATES PATENT AND TRADEMARK OFFICE
CERTIFICATE OF CORRECTION

PATENT NO. : 11,832,158 B2
APPLICATION NO. : 17/985222
DATED : November 28, 2023
INVENTOR(S) : Bergström et al.

Page 1 of 1

It is certified that error appears in the above-identified patent and that said Letters Patent is hereby corrected as shown below:

In the Drawings

In Fig. 3, Sheet 3 of 16, and on the title page, the illustrative print figure, at block "302", Line 2, delete "UES," and insert -- UEs, --, therefor.

In Fig. 5, Sheet 5 of 16, at block "502", Line 2, delete "UES," and insert -- UEs, --, therefor.

In the Specification

In Column 5, Line 45, delete "multi-standard" and insert -- multi-standard radio --, therefor.

In Column 9, Line 60, delete "communication (M2M)," and insert -- (M2M) communication, --, therefor.

In Column 9, Line 63, delete "equipped" and insert -- equipment --, therefor.

In Column 13, Line 51, delete "use" and insert -- user --, therefor.

In Column 15, Line 26, delete "third substep" and insert -- third step --, therefor.

Signed and Sealed this
Fifth Day of March, 2024

Katherine Kelly Vidal
*Director of the United States Patent and Trademark Office*